United States Patent [19]

Botterell et al.

[11] 3,912,874

[45] Oct. 14, 1975

[54] CONFERENCE ARRANGEMENT

[75] Inventors: John Joseph Botterell, Fairfax, Va.; Robert Lewis Dayton, Bowie, Md.; James Raymond Guyler, Woodbridge, Va.

[73] Assignee: American Telephone and Telegraph Company, New York, N.Y.

[22] Filed: June 4, 1974

[21] Appl. No.: 476,417

[52] U.S. Cl. .......... 179/18 BC
[51] Int. Cl.[2] .......... H04M 3/56
[58] Field of Search .......... 179/18 BC

[56] References Cited

UNITED STATES PATENTS 3,504,130 3/1970 Gorgas et al. .......... 179/18 BC

*Primary Examiner*—William C. Cooper
*Attorney, Agent, or Firm*—C. H. Davis

[57] ABSTRACT

A conference arrangement for use with a telephone switching center is disclosed. The conference arrangement comprises a transmission bridge for interconnecting an originator's port circuit with a plurality of conferee port circuits. A dial pulse register and a multifrequency receiver and decoder are associated with the originator's port circuit and each conferee port is equipped with an automatic dialer that can be programmed to summon the conferees via regular and alternate telephone numbers.

The originator is connected to the bridge by dialing the telephone number assigned to the bridge including a digit for establishing the precedence level of the conference call and a pattern number which selects the group of conferees to be summoned by the automatic dialers.

Once connected to the conference arrangement, the originator can transmit tones to the multifrequency receiver and decoder to selectively control all ports of the bridge and any other similar bridges that are connected to the bridge via a conferee port. Among other things, the originator can transfer himself and a selected conferee to an ad-lib bus for private consultation, place the conference in a broadcast mode and insert different pattern numbers in selected ones of the automatic dialers to summon other conferees. The originator can also select a conferee port mode to directly dial the telephone number of a conferee.

18 Claims, 17 Drawing Figures

PART OF DIAL PULSE INCOMING REGISTER 110

FIG. 4 ORIGINATOR PORT CIRCUIT 114

"70-79" CODE DRIVER 111

DECODER 109

CONFERENCE ARRANGEMENT

FIELD OF THE INVENTION

In a communication system, conference arrangements are provided to permit groups of customers to converse with each other. These conference arrangements can be classified in two general categories frequently designated "meet-me" and "group call." The term "meet-me" refers to conference arrangements wherein at a predetermined time all conferees rendezvous by calling a designated converence number. The term "group call," however, refers to a conference arrangement such as the one disclosed herein whereby one party, called the conference originator, initiates action to summon all other conferees.

BACKGROUND OF THE INVENTION

While many conference arrangements have been proposed in the prior art these arrangements lack certain features which have been incorporated in a proposed arrangement.

In one typical conference arrangement used in a telephone system, the conference originator dials a telephone number assigned to a multiport transmission bridge circuit. Each port of the conference bridge is associated with a line circuit of the telephone system and when the originator is connected to the bridge one of the line circuits is seized through its corresponding port. Dial tone is returned to the originator and the originator dials the telephone number of one of the conferees. As each conferee answeres another line is automatically seized for the conference originator to permit the dialing of the next conferee. While these arrangements permit the conference originator to connect any conferee to the conference, the conference originator has no direct control over the individual port itself.

It is therefore one object of our invention to provide a conference arrangement wherein the conference originator can exercise control over selectable port circuits.

With other prior art conference arrangements the conference circuit will automatically summon a group of conferees as soon as the conference circuit is seized by the conference originator. These conference arrangements are sometimes programmed so that different groups of conferees are selected depending on the number dialed by the conference originator. Some of the conference circuits are also arranged to automatically dial the number associated with a similar conference circuit so that many secondary conference circuits can be added to the original primary conference circuit to form a larger conference circuit. While these conference arrangements automatically establish connections and relieve the conference originator of the burden of dialing the individual conferees, the conference circuits do not permit the conference originator to exercise control over the program and over secondary conference bridges which are added to the primary bridge.

Accordingly, it is another object of our invention to provide a preprogrammed conference circuit wherein the conference originator can exercise selective control over the program.

A further object of our invention is to provide a conference arrangement wherein the conference originator can select a port of a primary bridge to extend a connection to a similar bridge and thereafter exercise the same control over the secondary bridge as if the conference originator were connected directly to the secondary bridge.

SUMMARY OF THE INVENTION

These and other objects are attained in the one illustrative embodiment of the invention wherein a conference arrangement comprises a transmission bridge having an originator's port circuit and a plurality of conferee port circuits. Associated with the originating port circuit are facilities responsive to signals from the originator to control the originating port circuit and the conferee port circuits. Furthermore, each conferee port circuit has associated therewith automatic dialing apparatus for initiating calls to designated conferees in accordance with prearranged programs.

More specifically, in the one illustrative embodiment disclosed herein the originating port circuit is equipped with a multifrequency receiver circuit and decoder circuitry. The multifrequency receiver is responsive to tone signals transmitted from the conference originator and these tones are translated by the decoder into signals for controlling the various modes of operation of the conference arrangement, prior to and during an established conference. Thus, for example, the originator is able to select any conferee port and cause that conferee to be disconnected from the conference bridge and connected privately to the originator over a separate ad-lib communication bus. Also, the originator can cause a conference arrangement to assume a broadcase mode so that the originator can converse with the conferees but the conferres cannot converse with each other. Further, the originator has the capability of inserting different dialing patterns into the automatic dialing apparatus so that different groups of conferees may be summoned to the conference or the conference originator can seize a conferee port and dial a conferee directly.

DESCRIPTION OF THE DRAWING

A better understanding of these and other features of the arrangement contemplated will be had with the following description made with respect to the drawing in which.

Figure 1:
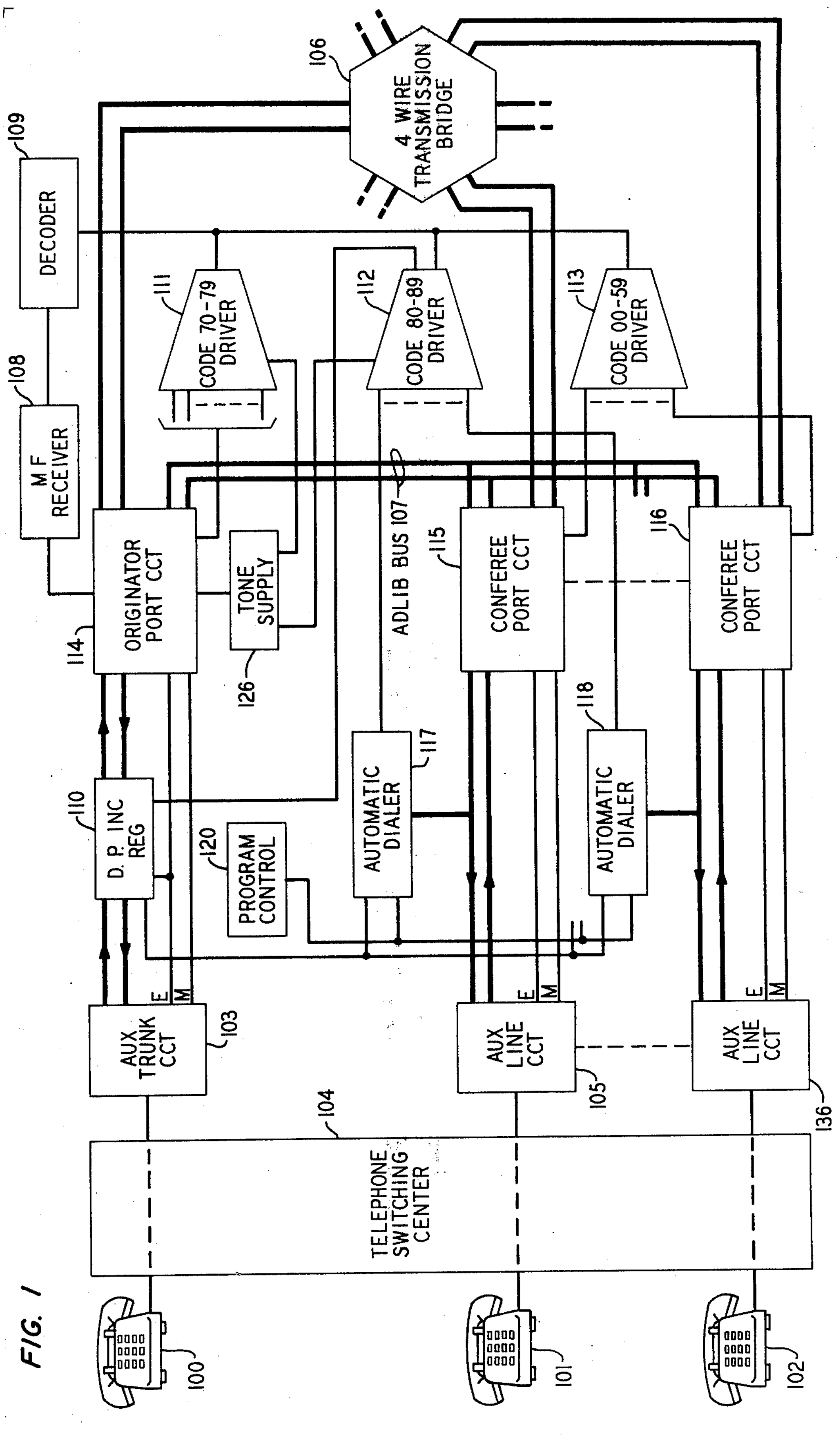
FIG. 1 is a block diagram of a conference arrangement.

Whenever possible the apparatus has been given a combined number and letter reference designation. The number preceding the letter designation indicates the Figure of the drawing in which the apparatus appears. In the case of certain apparatus such as relays, the contacts are given the same reference designation as a winding followed by the contact number.

BRIEF DESCRIPTION OF THE ARRANGEMENT

The overall conference system is disclosed in block diagram form in FIG. 1. The conference circuitry is connected to the customers it serves via a telephone switching center 104 which can be any one of the many types of switching systems found in the prior art. To provide suitable high quality transmission the various subassemblies of the system are interconnected over four-wire transmission paths and the well-known E and M lead signaling system is used throughout.

The conference circuitry interfaces the switching center serving the customers by auxiliary line and trunk circuits. More specifically, the access to the conference circuit by the customer originating a conference call is via auxiliary trunk circuit 103. Auxiliary trunk circuit 103 appears like an outgoing trunk at the telephone switching center 104. The conferees, on the other hand, are connected to the conference via auxiliary line circuits such as 105 and 136. These auxiliary line circuits appear as customer lines at the switching center and calls are extended from the auxiliary line circuits to the customer stations or to other conference circuits in the same manner as calls are extended from conventional customer line circuits.

Conversation between the conference originator and the conferees is via a four-wire multiport transmission bridge 106 and an ad-lib bus 107. The conference originator is connected via originating port circuit 114 to the bridge while the conferees are connected to the bridge via conferee port circuits such as 115 and 116.

Associated with the originator's port circuit is a dial pulse incoming register 110, multifrequency receiver 108 and decoder 109. Register 110 receives digits from switching center 104 during the establishment of a conference call. These digits are used to establish the level of precedence for the conference call in addition to controlling the selection of different dialing patterns which determine the identities of the conferees that are to be automatically summoned for a particular conference.

The multifrequency receiver 108 and decoder 109 respond to multifrequency signals transmitted from the conference originators station to control the various modes of operation of the conference circuit as described below. Connected to the decoder are three code driver circuits 111, 112 and 113. Driver 111 responds to two-digit codes 70 – 79 from the decoder to control the originator's port circuit 114, while driver 112 responds to the codes 80 – 89 to control the dialing patterns of the automatic dialers 117 and 118 which are associated with the conferee port circuits 115 and 116 respectively. Driver 113 responds to the codes 00-59 to control each of the conferee port circuits.

Associated with each conferee port circuit is an automatic dialer. The automatic dialer such as 117 comprises a memory containing the telephone numbers of the conferees and control circuitry for initiating calls over the telephone network via auxiliary line circuit 105.

To originate a conference all the customer dials the desired precedence level, the telephone number assigned to the particular conference bridge and the conference dialing pattern. In the system being described each call is assigned a level of priority or precedence by the calling customer and the calls having a higher priority take precedence over lower priority calls, that is, the higher priority calls can commandeer equipment which is busy serving lower priority calls. As soon as the switching machine associated with the conference arrangement receives a call from the conference originator, the originator's port circuit 114 will be seized and the precedence digit and the last digit of the telephone number assigned to the conference circuit will be transmitted in the form of dial pulses from the switching center to dial pulse incoming register 110. Incoming register 110 converts the signals to binary code and forwards the binary coded information to the automatic dialers 117 and 118. The precedence digit will be converted to multifrequency signals to be outpulsed by the automatic dialers while the last digit which represents the dialing pattern number will select the conferee to be called by a particular dialer.

As mentioned above, each automatic dialer has a memory which contains a list of conferees that can be summoned upon the receipt of various dialing pattern numbers from the conference originator. Thus, for each dialing pattern number a group of conferees are connected together over the conference circuit by having the automatic dialer associated with each conferee port circuit dial one of the conferees on its list.

The conference arrangement can also operate in a primary or secondary mode. This mode is established by the pattern number digit. The primary mode of operation refers to a conference arrangement that the originator dials directly into while the secondary mode of operation refers to a conference arrangement which has been activated by another conference arrangement which is operating in its primary mode.

When dial pulse incoming register 110 receives its two digits from the switching center it cuts through the originator's voice path to the bridge and a tone from tone supply 126 is returned to the originator indicating to the customer at the originating station that he has been connected to the conference bridge.

When the dialing pattern information has been stored in the automatic dialer 117, the automatic dialer will be activated to originate a call to a selected conferee by seizing auxiliary line circuit 105 and initiating a request for service at telephone switching center 104. Upon receiving dial tone automatic dialer 117 outpulses the precedence digit followed by the called conferee's telephone number as determined by the dialing pattern. If the called conferee's telephone line is busy or the conferee does not answer within a predetermined time interval the automatic dialer assumes that the called party cannot be reached at that telephone number and initiates a call to an alternate number that has been programmed into the dialer. The dialer will automatically keep trying the regular and alternate telephone numbers of the conferees until the conferee answers or until the originator transmits a control signal to stop the automatic dialer. When a conferee answers, the automatic dialer associated with that conferee port circuit will be released and the conferees voice path will be cut through to the four-wire transmission bridge 106.

When the conference is established an alerting tone is applied to the bridge via originator's port circuit 114 from tone supply 126. This informs each dialed conferee that a conference is being established. The circuitry can also be arranged to put the tone under control of the originator so the originator can apply and restore the tones by the dialing of special codes.

The conference arrangement also permits the originator to hold private conversations with individual conferees during a conference call. All other conferees will still be connected to the bridge but will not be able to hear the conversation between the originator and the individual conferee. However, the conferees that remain connected to the bridge will be able to converse with each other during this private conversation.

To initiate this action the conference originator keys in a control character plus a two digit character between 01 and 59 designating a particular port with which the private conversation is to be held. As described below a control character precedes every command code to select the primary or secondary bridge over which the command is to be executed. The multifrequency tones transmitted by the originator are received by MF receiver 108 and converted to binary code for transmittal to decoder 109. Depending on the two-digit code keyed in, driver 113 activates the conference port circuits to disconnect conference originator and the conferee port circuit from the bridge and interconnect both parties via ad-lib bus 107.

If there is a conferee connected to a selected port circuit the originator can converse with him over the ad-lib bus. The originator can also key in a control character and the code 73 to cause a conferee to be disconnected from the port. After the conferee has been disconnected, the originator can cause the selected conferee port circuit to initiate a service request at switching center 104. When auxiliary line circuit 105 receives dial tone from the switching center the conference originator can begin dialing the telephone number of a new conferee. The conference originator can use a similar procedure and summon each of the conferees individually by keying in a control character and the code 85 to stop the action of the automatic dialers, thereby permitting the conference originator to dial a conferee for each port circuit.

If the conference originator has selected a conferee for connection to the ad-lib bus the conference originator can return the conferee and himself to the bridge by keying in a control character and the code 00.

The originator may also select a broadcast mode of operation by dialing a control character and the code 72. This mode of operation permits the originator to be heard by all conferees but prevents them from talking back through the four-wire transmission bridge.

When the originator decides to end the conference he need only to go on-hook and the switching system will cause auxiliary line circuit 103 to signal over its M lead to the conference circuit causing a disconnect. At this time the conference circuitry will be reset and all conferee ports will be released.

DETAILED DESCRIPTION

Figure 2:
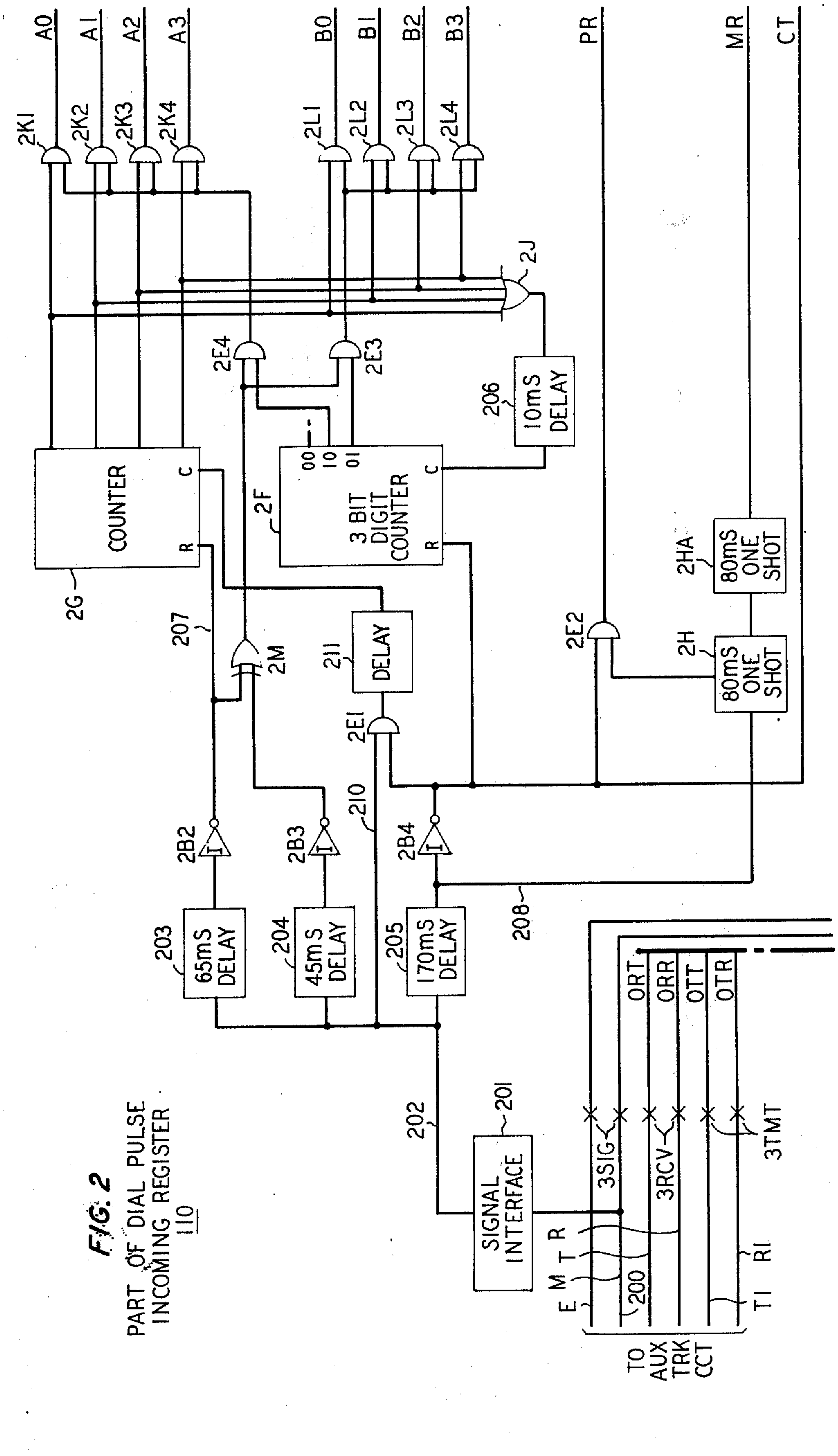
FIGS. 2–10, when arranged in accordance with FIG. 11, show a more detailed schematic representation of a portion of the conference arrangement.
Figure 3:
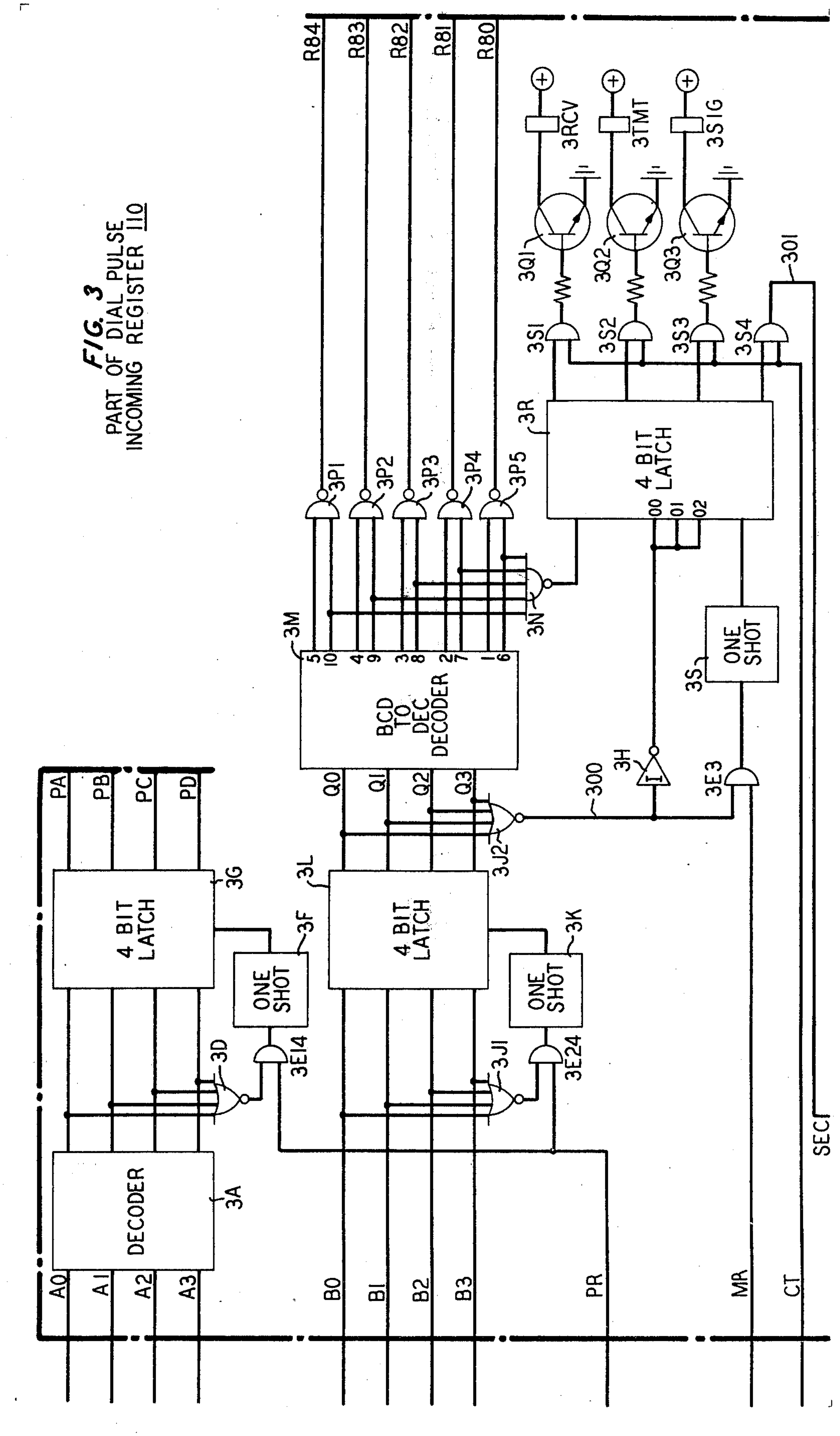
Figure 4:
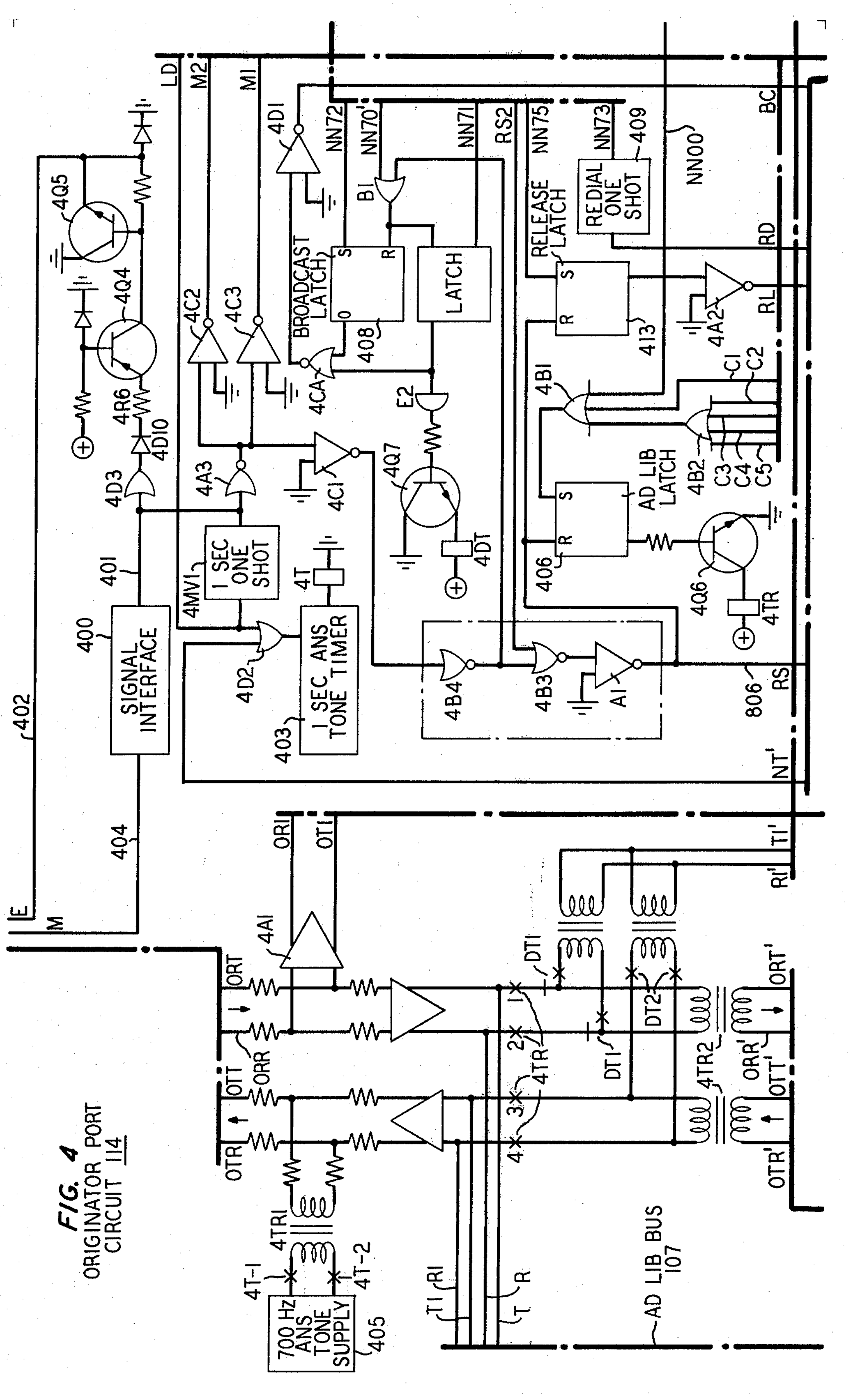
Figure 5:
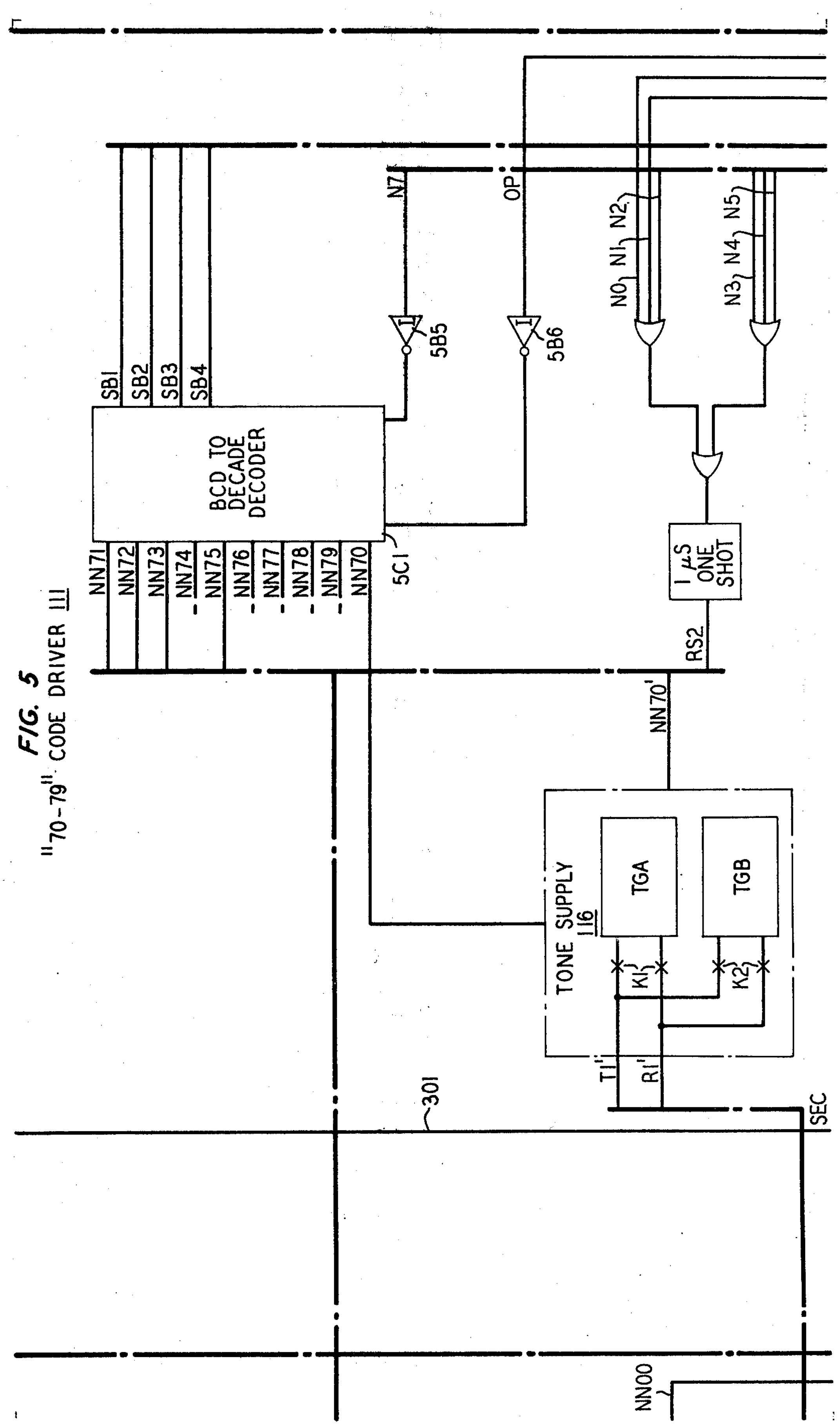
Figure 6:
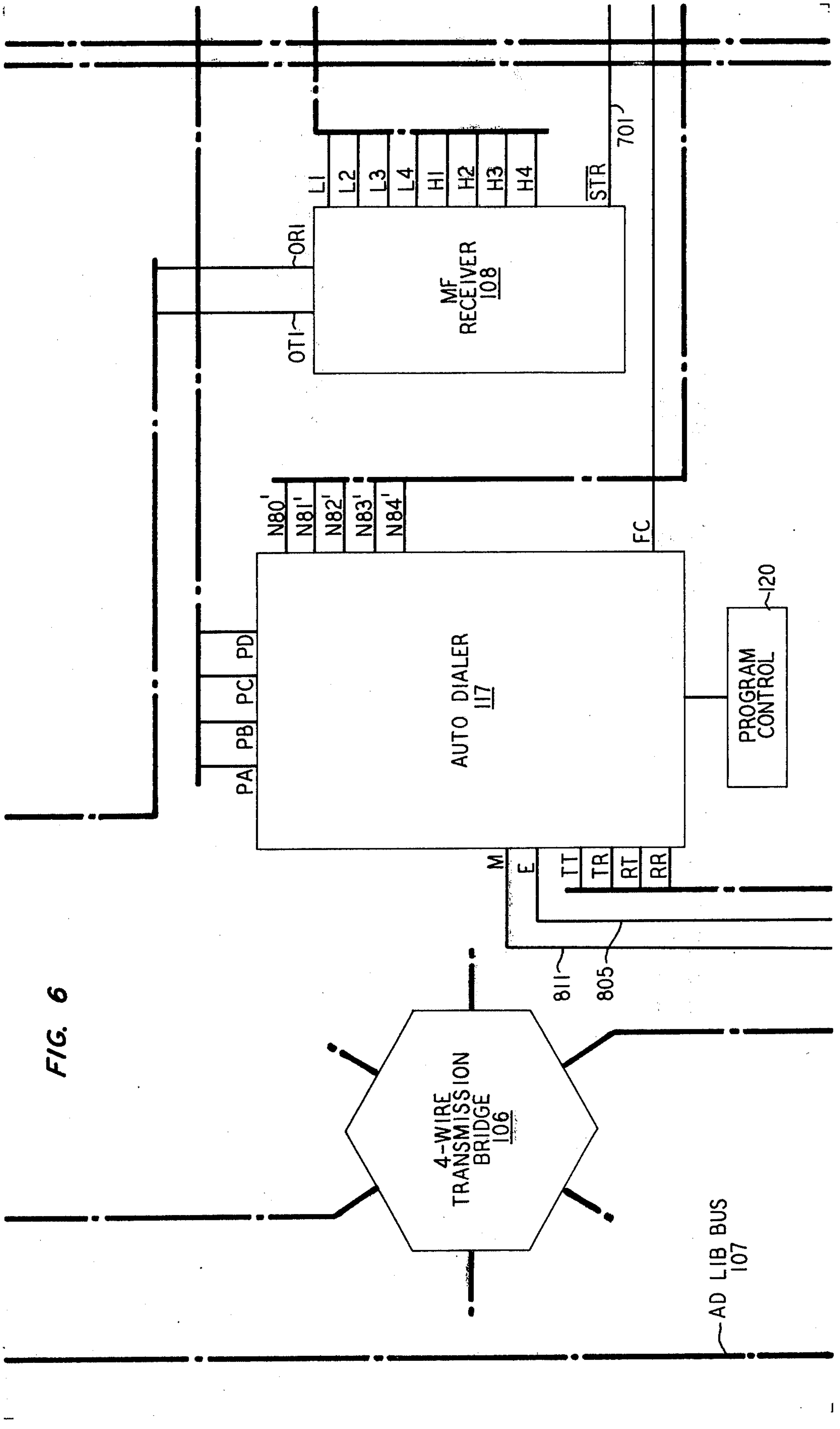

Turning now to FIGS. 2–10, arranged according to FIG. 11, a more detailed description of the conference arrangement will now be given. The originator's port circuit 114 is shown in more detail in FIG. 4 and this is connected via an auxiliary trunk circuit to the switching center as shown in FIG. 1. Associated with the originating port circuit 114 are incoming dial pulse register circuit 110, which is shown in FIGS. 2 and 3, multifrequency receiver 108, which is shown in FIG. 6, and tone supply 126, shown in FIG. 5.

Figure 7:
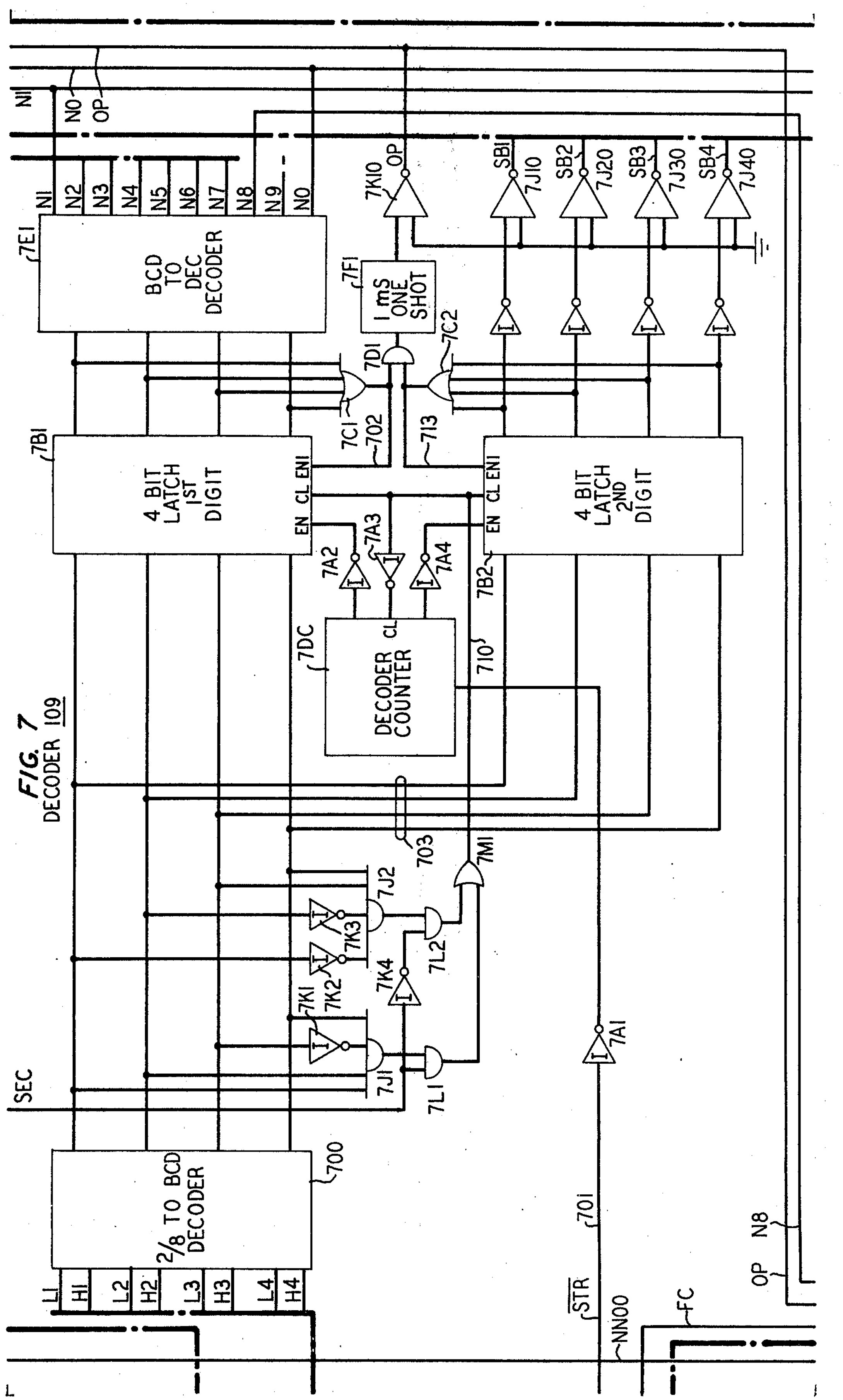
Figure 9:
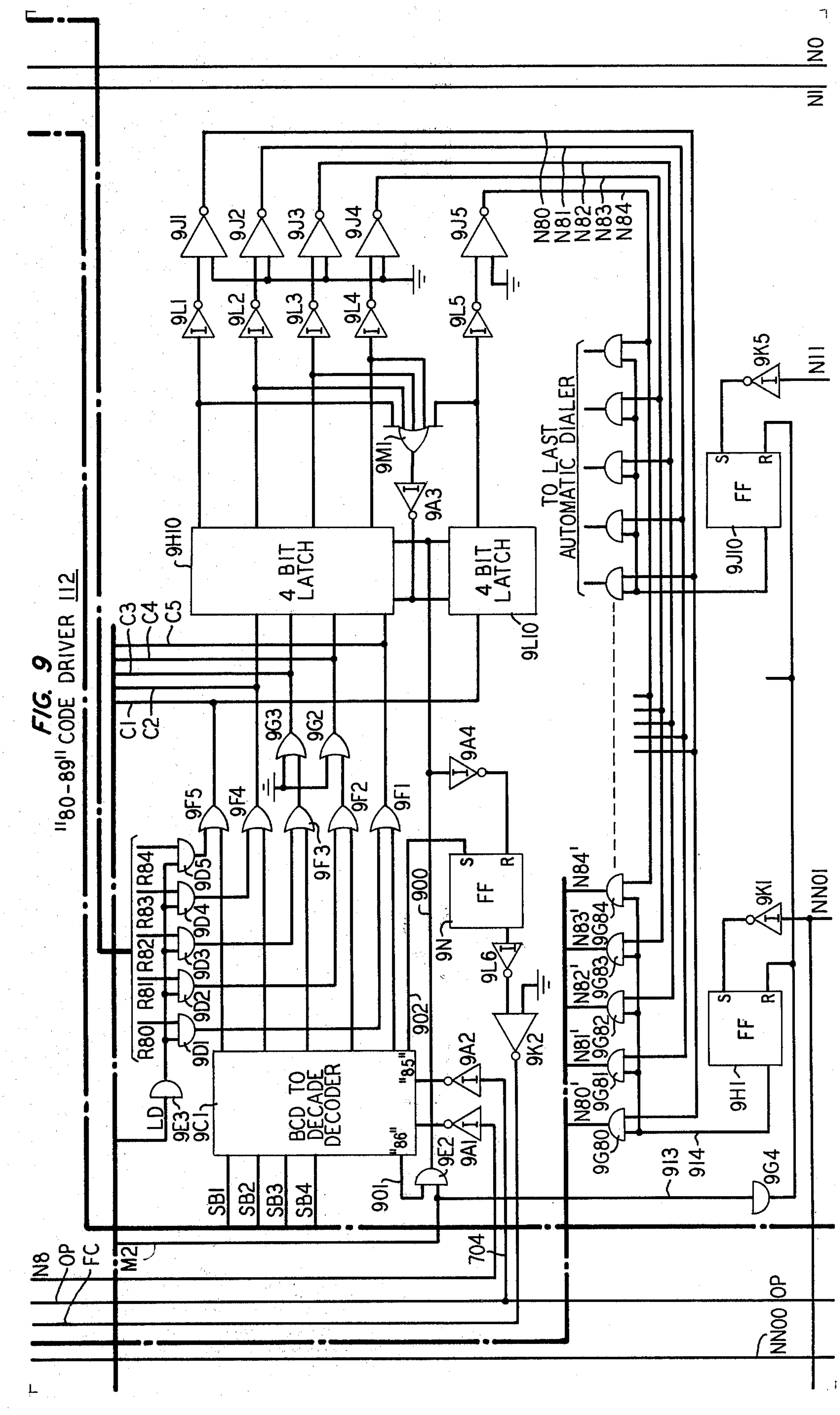
Figures 10, 11:
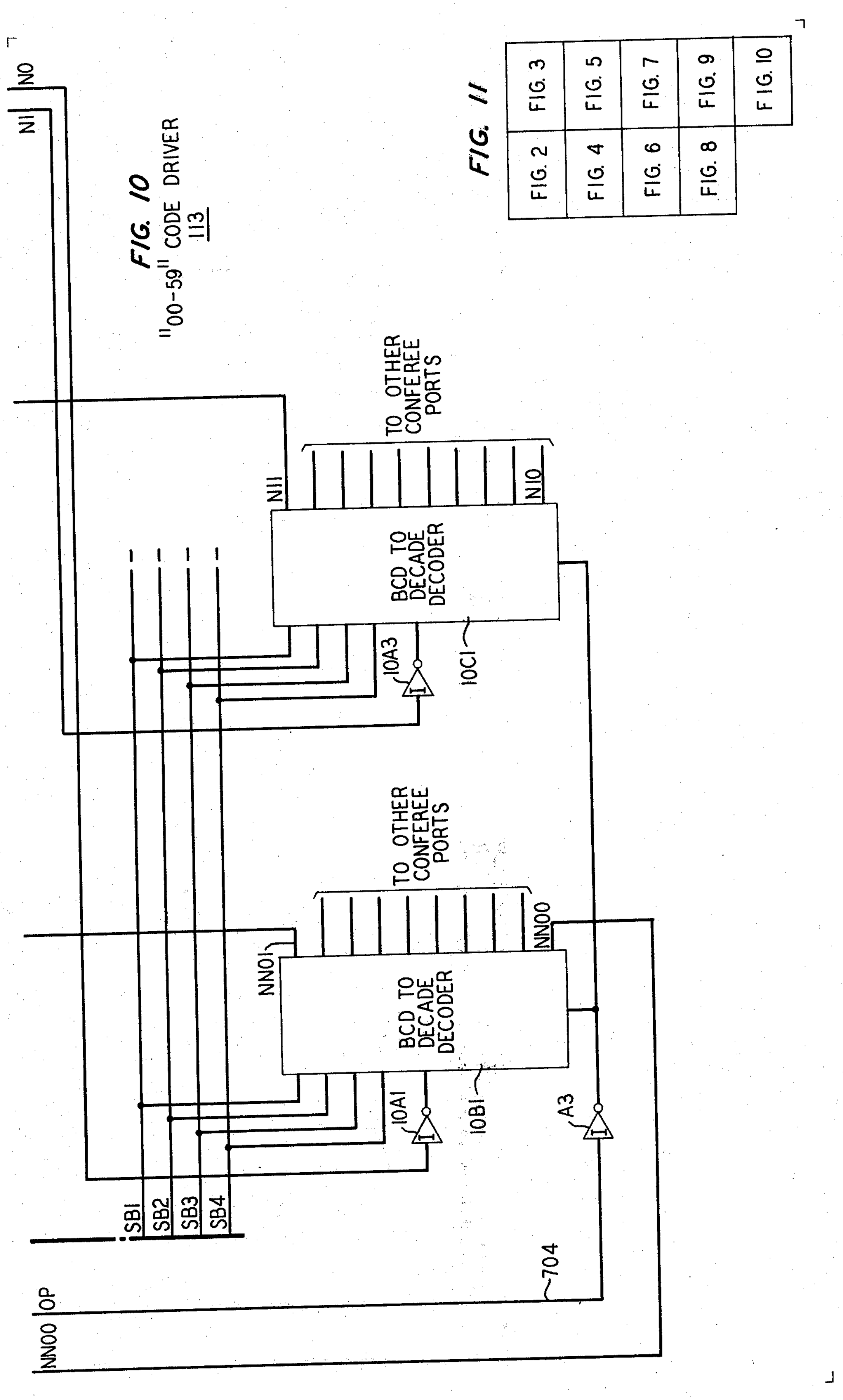

The output of multifrequency receiver 108, as decoded by decoder 109 in FIG. 7 enables three drives whose outputs control the various modes of operation of a system. Driver 111, which responds to codes 70-79 is shown in FIG. 5, while driver 112 responds to codes 80-89 is shown in FIG. 9. Driver 113 is shown in FIG. 10 and this driver responds to the codes 00-59.

Figure 8:
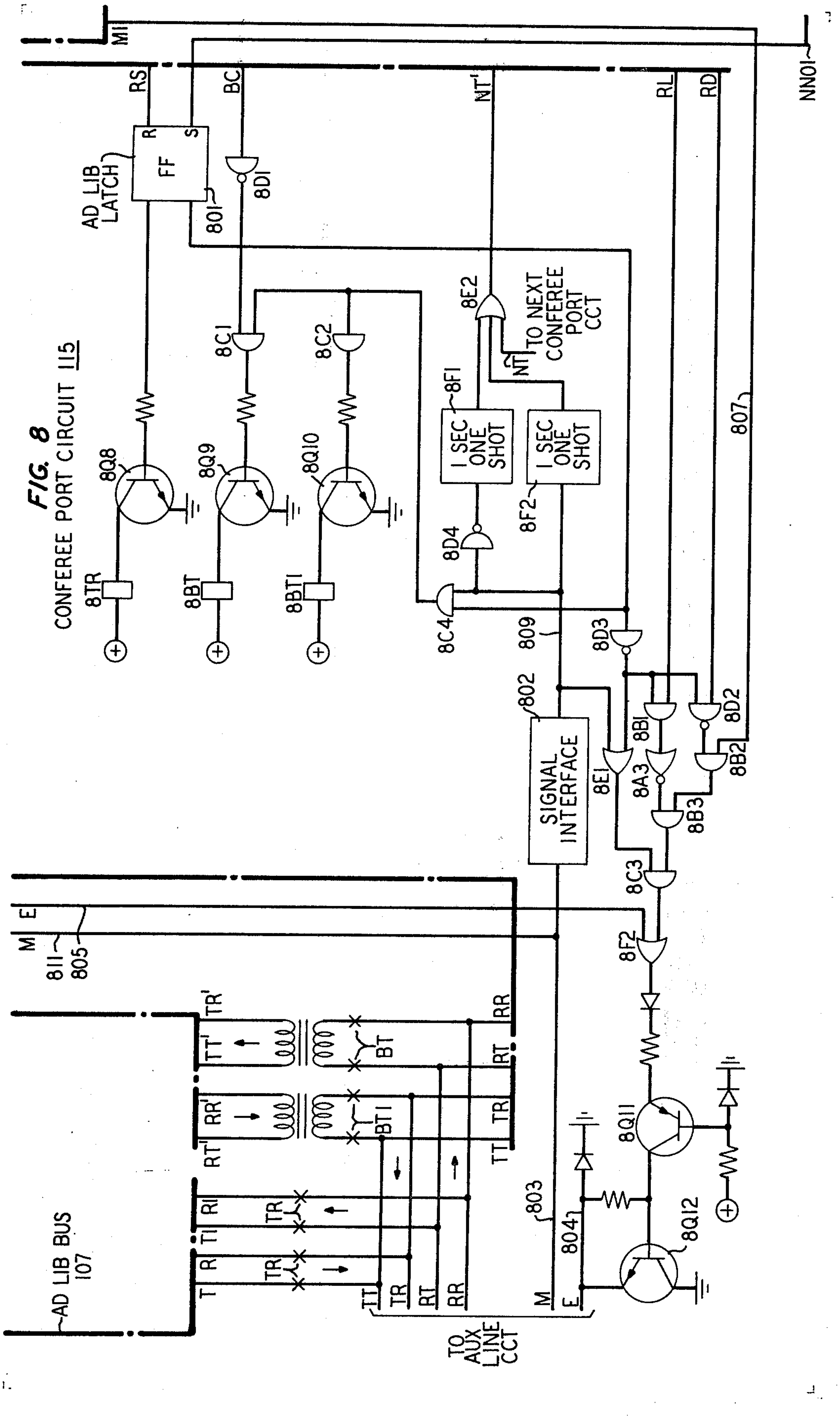

A typical conferee port circuit is shown in FIG. 8 and this is connected to the telephone switching center via an auxiliary line circuit, as shown in the block diagram of FIG. 1. Associated with the conferee port circuit is an automatic dialer 117 depicted in block diagram form in FIG. 6. Also shown in FIG. 6, is the four-wire transmission bridge 106 and a program control 120. Program control 120 is used by the maintenance personnel to test the automatic dialers and to establish the various dialing patterns in the memories associated with each dialer.

To illustrate the operation of the arrangement let it be assumed that a conference originator has dialed a telephone number associated with the conference shown in FIGS. 2–10. As mentioned above, the conference originator dials a precedence digit plus the telephone number and the last digit of the telephone number includes the dialing pattern to be established by the automatic dialers in summoning the conferees. If the dialing pattern number is a digit from 1 through 5, the conference arrangement will function in its primary mode, that is, it will be controlled as a first conference arrangement and the conference originator will dial directly into it. The dialing pattern numbers 6–9 and 0 are outpulsed from a conference operating in its primary mode and cause the conference arrangement receiving these numbers to function in its secondary mode.

When the switching center seizes the auxiliary trunk circuit associated with the originating port circuit, negative battery is applied to M lead 200 to initially activate signal interface circuit 201 associated with the dial pulse incoming register 110 and later this signal activates signal interface circuit 400 associated with the orginator's port circuit 114. These interface circuits are used to make the signaling of the auxiliary trunk circuit compatible with the electronic circuitry of the conference circuit and among other things, prevent the false operation of the conference circuit due to hits and noise on the line.

*Dial Pulse Incoming Register* (FIGS. 2 and 3)

Dial pulse incoming register 110 will count and store two digits received from the switching center. The first digits will be stored in the four bit latch 3G and the second digit will be stored in latch 3L. After the second digit is received the originator's transmit and receive paths are cut through to the conference originator's circuit. The digits are counted by the circuitry in FIG. 2 while the circuitry in FIG. 3 stores the digits and causes a cut-through of the originator's voice and signaling paths.

As mentioned above, the seizure signal on the M lead from the auxiliary trunk circuit activates signal interface 201 and the output of the signal interface 201 is transmitted over conductor 202 to three pulse delay circuits 203, 204 and 205. Circuits 203 and 204 provide the holdover timing during the interpulse intervals of each received digit. At the end of each incoming pulse, the outputs of inverters 2B2 and 2B3 remain high for the duration of the respective time intervals of pulse delay circuits 203 and 204. Since there is a 20 millisecond difference between the timing intervals of circuits 203 and 204. EXCLUSIVE OR gate 2M will only provide a logic high when one and only one output of the inverters 2B2 and 2B3 is a logic high.

When gate 2M is enabled, a high will be transmitted to one input of each of AND gates 2E3 and 2E4. The other input of AND gates 2E3 and 2E4 depends on the output of three-bit digit counter 2F that is arranged to operate in a three-bit mode (00, 10, 01) to steer the incoming digits to the proper latches.

At the end of the first digit there will be at least one logical high on the outputs of binary pulse counter 2G. This will be transmitted to the transfer gates 2K1-2K4 and 2L1-2L4 and to OR gate 2J. The output of OR gate 2J is transmitted to 10 millisecond delay 206 and as the output is present more than 10 milliseconds the signal will advance digit counter 2F to the next count. The first digit will advance the digit counter to its 10 count mode to enable gate 2E4 thus steering the output of the pulse counter 2G through transfer gates 2K1-2K4 to decoder 3A. Upon the receipt of the second digit, digit counter 2F will be in its 01 mode to enable gate 2E3 and transfer gates 2L1-2L4 thus transferring the second digit to four-bit latch 3L.

The output of inverter 2B2 is also coupled over conductor 207 to pulse counter 2G at the end of the 65 millisecond timing interval of delay circuit 203. This resets counter 2G to zero for receiving the next train pulse.

Pulse delay 205 is mainly a guard timer to isolate the circuit from hits on the line that are less than 170 milliseconds in length. As soon as circuit 205 is activated, a signal is transmitted over conductor 208 to trigger one shot 2H for 80 milliseconds and at the end of that interval one shot 2HA is triggered for an additional 80 milliseconds to provide an output on conductor MR which partially enables AND gate 3E3. The other output of one shot 2H combines with the output of inverter 2B4 to enable AND gate 2E2 thereby transmitting a logical low signal over conductor PR to partially enable AND gates 3E14 and 3E24. When delay circuit 205 was activated it transmitted a logical high signal to one input of each of AND gates 2E1 and 2E2. As the dial pulses are received from the switching system a high will be received on conductor 210 to enable AND gate 2E1 and delay circuit 211 which triggers pulse counter 2G. Delay 211 prevents the counting of high speed pulses and counter 2G converts the decimal count to binary-coded-decimal. As mentioned above, the output of the counter is transmitted through transfer gates to decoder 3A or latch 3L depending upon the count in digit counter 2F. The first or precedence digit is received by decoder 3A in one form of binary-coded-decimal and transformed into another binary-coded-decimal format for transmission to four-bit latch 3G. The second digit or dialing pattern number is transmitted in binary-coded-decimal format to latch 3L and converted by decoder 3M for use by the automatic dialers as described below.

NOR gate 3D is enabled by at least one high on the output of decoder 3A to enable AND gate 3E14 in conjunction with the signal on conductor PR as described above. This triggers one shot 3F to enable latch 3G to store the precedence digit. Latch 3L is triggered in a similar manner by one shot 3K to store the dialing pattern digit.

Decoder 3M converts the binary-coded-decimal to decimal format. Since the pattern select digit also controls whether the conference circuit is working in a primary or secondary mode of operation the 80 pattern may either be selected by the digits 1 or 6, pattern 81 may be selected by the numbers 2 or 7, etc., NAND gates 3P1-3P5 combine these outputs into a single output on conductors R80-R84. The outputs 6–10 of decoder 3M are monitored by NAND gate 3N and a low signal on any one of these leads enables NAND gate 3N indicating that the conference is operating in its secondary mode.

Another four-bit NOR gate 3J2 monitors the output of latch 3L to detect when the second digit has been stored. The low output of gate 3J2 on conductor 300 turns off AND gate 3E3 to trigger one shot 3S and enable latch 3R.

At the same time, the logical low signal on conductor 300 is inverted by inverter 3H and transmitted to the 00, 01, and 02 inputs of the latch thereby enabling latch 3R.

Each output of the latch 3R is transmitted to AND gates 3S1-3S4. The other input to these AND gates is derived over conductor CT which was activated when the originator seized the conference arrangement. Gates 3S1-3S3 enable transistors 3Q1-3Q3 to operate cut-through relays 3RCV, 3TMT and 3SIG.

When the cut-through relays operate in FIG. 3 they cause their contacts in FIG. 2 to connect the auxiliary trunk circuit associated with the conference originator to the originating port circuit in FIG. 4.

Gate 3S4 will be enabled as one of the dialing pattern numbers is 6, 7, 8, 9 or 0 indicating that the conference is in its secondary mode of operation.

Originator's Port Circuit (FIG. 4)

When the cut-through relays are operated as described above, a four-wire transmission path and E and M signaling leads were extended from the auxiliary trunk circuit at the switching center to the originating port circuit 114. The seizure signal on M lead 200 is extended over conductor 404 to activate signal interface 400 associated with originators port circuit 114.

The conference originator is connected to this port circuit via the aforementioned cut-through relay 3RCV and 3TMT over conductors OTT, OTR, ORT and ORR. The receive side of the line (ORT and ORR) is coupled via amplifier 4A1 over conductors OT1 and OR1 to multifrequency receiver 108 in FIG. 6, while the transmit side (OTT and OTR) is connected via transformer 4TR1 and contacts of relay 4T to answer tone supply 405.

When the originator's port circuit is seized the output of signal interface 400 is a logic high which is transmitted over conductor 401, through gate 4D3, diode 4D1 and resistor 4R6 to the emitter of transistor 4Q4. Transistor 4Q4 conducts causing transistor 4Q5 to conduct and transistor 4Q5 transmits ground over E lead 402 to the auxiliary trunk circuit at the switching center. This signal on E lead 402 is interpreted as an answer supervision signal to the switching center.

The output of signal interface 400 is also inverted by gate 4A3 to the input of line drivers 4C1 and 4C2 and the output of these drivers is used to control the conferees port circuit in FIG. 8 and the decoder driver in FIG. 9 which in turn controls the other functions of the conference arrangement.

The output of signal interface 400 on conductor 401 also triggers one shot 4MV1 to provide a one second high on the input of OR gate 4D2. OR gate 4D2 is enabled to trigger answer tone timer 403 which operates relay 4T for one second. At its contacts 4T-1 and 4T-2, relay 4T connects a 700 Hertz answer tone supply 405 to the originator's transmit path to inform the originator that he is connected to the conference arrangement.

Under normal operation, the conference originator is connected to the four-wire transmission bridge 106 in FIG. 6. More specifically, transistor 4Q6 is connected to the normally low side of ad-lib latch 406 and transistor 4Q6 is turned on to hold relay 4TR operated. At its contacts 4TR1-4TR4, relay 4TR connects the transmit and receive paths from the originator through transformers 4TR2 via conductors ORT', ORR', OTT' and OTR' to transmission bridge 106. This permits a two-way conference between the originator and all conferees that are subsequently to be connected to the other ports of the bridge.

The precedence digit and the dialing pattern number stored in the dial pulse incoming register 110 as described above, are forwarded to the automatic dialers associated with each conferee port. The automatic dialers then seize their respective auxiliary line circuits at the switching center, and upon the receipt of dial tone, each dialer dials the number of the wanted conferee.

When the conference originator wishes to converse privately with one of the conferees he dials a control character to select the proper conference arrangement plus the two-digit address code of the conferee with whom he wished to talk privately. This causes the conference originator to disconnect himself from transmission bridge 106 by setting ad-lib latch 406 which releases relay 4TR and the selected conferee is also connected to the ad-lib bus.

While the originator is connected to a conferee port via the ad-lib bus he has a choice of three different actions. First, he can dial a control character plus the code 00 to return himself and the conferees to the conference bridge. If the originator dials a control character plus the code 73 the conferee will be released and dial tones will be heard by the originator. Then the originator can manually dial the telephone number associated with a new conferee. Should the originator dial the code 75 the conferee will be released from the port but the port circuit will not initiate a new request for dial tone.

The redial logic in the originator's port circuit consists of one shot 409 which is triggered by a signal over conductor NN73. This signal is generated in code driver 111 when the originator dials the code 73. One shot 409 transmits a one microsecond pulse over conductor RD to signal a momentary disconnect to the conferee port circuit.

When the originator dials the code 75 a momentary signal is received from code driver 111 in FIG. 5 over conductor NN75 to set release latch 413, causing line driver 4A2 to go high and transmit a signal over release latch conductor RL to the conferee port circuit as described below.

The originator port circuitry also includes logic circuitry whereby the conference originator can put the conference circuit in a broadcast mode of operation. In this mode the originator can talk to the conferees but the conferees cannot talk to each other. The originator establishes this mode of operation by dialing a control character and the two-digit code 72 which puts a logic high from code driver 111 on conductor NN72 to set broadcast latch 408. Latch 408 transmits a logic high to the input of NOR gate 4CA which transmits a low to the input of line driver 4D1. The output of line driver 4D1 is a logical high on conductor BC which is transmitted to the conferee port circuits to establish the broadcast mode.

Conferee Port Circuit (FIG. 8)

The conferee port circuit 115, shown in FIG. 8, provides the voice paths and switching functions necessary to connect the conferee to transmission bridge 106 or to ad-lib bus 107. As mentioned above, the conference originator dials a control character plus the two-digit address code of a conferee to transfer that conferee from the transmission bridge 106 onto ad-lib bus 107. The two-digit address code of the conferee port 115 is the code 01 and when the originator dials this code a logical high from code driver 113 in FIG. 10 appears on conductor NN01 to set ad-lib latch 801. With latch 801 set, transistor 8Q8 turns on to operate relay 8TR and relay 8TR completes a four-wire path between the conferee and ad-lib bus 107.

Ad-lib latch 801 is reset by a logical high received from the originator's port circuit on reset conductor RS. This occurs whenever the originator dials a control character plus the first digit of a two-digit code as recognized by the code driver 111 in FIG. 5. Also shown in FIG. 8 are two relays 8BT and 8BT1. When relay 88T is operated the conferee port circuit will be in a receive-only or broadcast mode of operation. When both relays 8BT and 8BT1 are operated, the conferee is completely disconnected from transmission bridge 106 and can only talk over ad-lib bus 107.

When the originator dials a control character and the two-digit code 72 to establish a broadcast conference, a logical high will appear on conductor BC. This high is inverted by gate 8D1 causing one input of NAND gate 8C1 to go high which turns off transistor 8Q9. In turning off, transistor 8Q9 releases relay 8BT. Relay 8BT is normally held operated by the logical high from gate 8D1 and a logical high from AND gate 8C4. Gate 8C4 is enabled from the normal high input of latch 801 and signal interface 802 which monitors the supervision on M lead 803 from the switching center.

Supervision to the switching center is sent over E lead 804 and this supervision is controlled from two sources in the conferee port circuit. If either input to OR gate 8F2 goes high, transistor 8Q11 will conduct, causing transistor 8Q12 to apply a ground to E lead 804. OR gate 8F2 is enabled by a signal over E lead 805 from automatic dialer 117 or if the conference circuit is manually operated. The originator can operate the conference manually by releasing a conferee from a particular port and redialing the telephone number of a new conferee over that port or the originator can transfer the conferee to ad-lib bus 107.

If the originator wanted to add a conferee to the conference, he would dial a control character plus the two-digit code of the conferee port to which the conferee is to be added. When the code 01 is dialed this sets ad-lib latch 801 transferring the conferee port 115 from transmission bridge 106 to ad-lib bus 107. The setting of latch 801 puts a logical low on the input of gate 8D3 which inverts the signal to place a high on the inputs or OR gate 8E1 which, in turn, puts a high on AND gate 8C3. Since the originator is still connected to the originator's port the originator is still connected to the originator's port circuit, a logical high is being received over conductor 807 to the input of AND gate 8B2. The other input of gate 8B2 is normally high until a redial order has been dialed by the originator. Gate 8B2 is therefore enabled, placing a high on one input of gate 8B3, the other input of gate 8B3 being normally high until a release order has been dialed by the originator. Gate 8C3 is enabled to provide a high output thereby enabling OR gate 8F2.

When a redial code is dialed by the originator a 1 second pulse will cause NAND gate 8D2 to go low thereby causing AND gate 8B2 to have a low output. This will, in turn, momentarily remove ground from E lead 804 and release the switching center connection to the conferee. Reapplication to ground to E lead 804 will reseize the auxiliary line circuit at the switching center returning dial tone to the conference originator. The conference originator can now dial the telephone number of a new conferee. If the originator dials the release code 75 a high signal is transmitted on release lead RL to enable AND gate 8B1. The output of gate 8B1 is inverted to make AND gate 8B3 have a low output and to remove the ground from lead 804. This is recognized as a steady disconnect signal at the switching center.

It will be recalled that when the originator was connected to the conference circuit, a 700 Hertz answer tone was returned to the orginator to inform him of the connection. This tone is also returned to the originator each time a conferee enters or leaves the conference.

Signal interface 802 responds to supervision on M lead 803 in that whenever a conferee is off-hook a logical high will be transmitted on conductor 809. This high will trigger one shot 8F2 which will enable OR gate 8E2 for 1 second. When OR gate 8E2 is enabled, a signal is transmitted over conductor NT' to the originator's port circuit thereby triggering answer tone timer 403 and returning 700 Hertz tone to the originator. When the conferee goes on-hook a low on conductor 809 will trigger one shot 8F1 which, in turn, triggers the answer tone timer 403 in FIG. 4 to return tone to the originator.

Multifrequency Receiver and Decoder (FIGS. 5–7 and 10)

As set forth above, the precedence and pattern number digits are automatically out-pulsed from the switching center and received by the dial pulse incoming register in FIGS. 2 and 3. After the originator is connected to the conference arrangement the originator can exercise direct control over the conference arrangement and each of the conferee ports by dialing directly into the conference arrangement.

The term "dialing" as used herein denotes any form of code signaling arrangement provided at the customer station. In the exemplary embodiment, the signaling is in the form of two-out-of-eight multifrequency tones and the originator's station is equipped with a 12 button key set. The buttons are designated by the digits 0-9 such as on a conventional rotary dial, in addition to two control characters namely, the number sign # and the asterisk *.

The multifrequency receiver 108 associated with the conference circuit is shown in FIG. 6 and this receiver is connected to the originator's port circuit via conductors 0T1 and OR1 and voice frequency amplifier 4A1. A combination of two tones is transmitted each time the originator depresses a pushbutton on his key set and these tones are converted to a direct current signal on one of the low conductors L1-L4 and a direct current signal on one of the high conductors H1-H4. The direct current signals are forwarded to decoder 109, shown in FIG. 7.

The two-out-of-eight code on the L- and H-conductors is converted to four-bit binary-coded-decimal by decoder circuit 700. The output of decoder circuit 700 represents the digits 0-9 plus the asterisk * and the number sign # symbols which are binary-coded-decimal 11 and binary-coded-decimal 12, respectively. The binary-coded-decimal 11 is detected by AND gate 7J1 to partially enable AND gate 7L1, while the binary-coded-decimal 12 is detected by AND gate 7J2 to partially enable AND gate 7L2.

The other input to AND gates 7L1 and 7L2 comes from secondary lead SEC which is a logical high when the conference arrangement is being used in its secondary mode and a logical low when the conference arrangement is being used in its primary mode. Thus, when the conference is in its primary mode the low or secondary lead SEC will disable gate 7L1 and partially enable gate 7L2 so that whenever a number # symbol has been dialed, AND gate 7L2 will be enabled thereby enabling OR gate 7M1. If the originator should dial the asterisk * control character the conference arrangement operating in its primary mode would not recognize this control character but a similar conference arrangement connected thereto and operating in its secondary mode would respond. This arrangement permits the originator to control the primary and secondary bridges in the same manner by dialing the different control characters before dialing the code associated with the command to be executed.

When OR gate 7M1 is enabled as a result of the receipt of a control signal such as an asterisk * or a number symbol # , gate 7M1 transmits a signal over conductor 710 to clear the four-bit latches 7B1 and 7B2 and to clear counter 7DC. The last two digits representing a command code are stored in latches 7B1 and 7B2 under control of steering circuitry including counter 7DC. When the first digit is received by multifrequency receiver 108 in FIG. 6, a momentary low signal is transmitted over start conductor 701, inverted by inverter 7A1 to advance counter 7DC which enables latch 7B1 to accept the first digit. The first digit is stored in the latch causing the latch to have at least one logical high output depending on the digit stored. THe high output is recognized by OR gate 7C1 which puts a high on lead 702 to prevent latch 7B1 from recognizing any more digits.

The second digit received by MF receiver 108 is also accompanied by a pulse on start lead 701 which advances counter 7DC to enable latch 7B2. The second digit is stored in latch 7B2 and the output of latch 7B2 is monitored by gate 7C2 which puts a logical high on conductor 703 when the digit is stored to prevent latch 7B2 from storing further information.

The logical highs from OR gates 7C1 and 7C2 indicate that both digits have been received and this enables AND gate 7D1 which triggers one shot 7F1 for 1 millisecond. One shot 7F1 transmits a logical high to line driver 7K1 and, driver 7K1 transmits a logical high signal over operate conductor OP to code driver 111 in FIG. 5, to code driver 112 in FIG. 9 and to code driver 113 in FIG. 10.

The tens of first digit of the two-digit command code is converted from binary-coded-decimal to decimal by decoder 7E1 which is manifested by a logical high signal on one of the tens (N-) output leads. These N- leads enable the respective drivers in FIGS. 5, 9, and 10. Thus, as any code in the series 70-79 is dialed by the originator a high is sent over conductor N7 to FIG. 5.

The units or second digit is transmitted in binary-coded-decimal over conductors SB1-SB4 simultaneously to all code drivers. Decoder circut 5C1 in FIG. 5, will not respond to the binary-coded-decimal input representing the units digit until a logical high is inverted by inverter 5B5 as a result of the tens digit 7 being dialed and a 1 millisecond pulse on conductor OP is inverted by inverter 5B6 indicating that both digits of the command code have been received.

The output of decoder 5C1 in FIG. 5 is a one-out-of-ten indication on the NN- conductors which are numbered corresponding to the tens and units digits dialed by the originator.

Thus, as described above, the code 72 will transmit a signal over conductor NN72 to set latch 408 in FIG. 4 and put the conference in a broadcast mode. The code 73 actuates the redial one shot 409 causing the conferee port to release and request dial tone so that a new conferee can be dialed. The code 75 causes the conferee port to release the conferee without requesting dial tone.

The code driver 113, shown in FIG. 10, is part of the circuitry which decodes the command codes 00-59 and is similar to code driver 111, shown in FIG. 5. Binary-coded-decimal to decade decoder 10B1 is actuated when the tens digit 0 is dialed by the originator as indicated by a logical high on conductor NO and when a high appears on operate lead OP. When actuated, decoder 10B1 converts the units digit which appears in binary code format on conductors SB1-SB4 to an indication on the NN00-NN59 conductors. Conductor NN00 is the address code assigned to the originator's port circuit of FIG. 4, while code 01 is assigned to the conferee port shown in FIG. 8. The other leads NN02-NN59 are connected to the other conferee ports that have not been shown to simplify the drawing. As mentioned above, when a signal appears on an NN- conductor assigned to a conferee port such as conductor NN01, the adlib latch in the port is actuated to transfer the conferee port from transmission bridge 106 to adlib bus 107.

The code driver 112 shown in FIG. 9 responds to any two-digit code in the series between 80 and 89 to provide dialing pattern numbers to the automatic dialers.

When a binary-coded-decimal number appears on the units leads SB1-SB4 of decoder 109 in FIG. 7, the number will also appear on the input of binary-coded-decimal to decade decoder 9C1. Decoder 9C1 will not respond to this input until a logic high is received on tens conductor N8 from decoder 109 in FIG. 7. This high is inverted by inverter 9A1 and appears along with a low pulse of 1 millisecond duration on conductor OP. The output of decoder 9C1 transmitted to one input of OR gates 9F1-9F5.

The input to code driver 112 on units leads SB1-SB4 and conductor N8 is derived from decoder 109 in FIG. 7 in response to the originator keying in various dialing pattern numbers after the orginator has been connected to the conference arrangement.

It will be recalled from prior descriptions that the dialing pattern number along with a precedence digit can be part of the address that the conference originator dialed to gain access to the conference arrangement. This dialing pattern number received from the switching center is registered in the dial pulse incoming register of FIG. 3 and is transmitted through gates 3P1-3P5 over conductors R80-R84 to AND gates 9D1-9D5.

The other input to the 9D- AND gates comes from inverter 9E3 that is used as a buffer in load data lead LD from the originator's port in FIG. 4. A 1 second logical high signal on lead LD is generated by one shot 4MV1 which is triggered when the switching center seizes the originating port circuit by applying negative battery to the M lead 404 as described above.

The four-bit latches 9H1 and 9L1, shown in FIG. 9, are reset by a logical low on lead M2 which orginates in the orginator's port circuit. When the originator's port circuit is seized a high is transmitted over conductor M2 and conductor 900 enable latches 9H1 and 9L1. These latches store the input information received over conductors R80-R84 from dial pulse incoming register 110 or the information received via multifrequency receiver 108 and decoder 109 over conductors SB1-SB4.

As soon as the bit information is stored in latches 9H1 and 9L1, the output is transmitted through NOR gate 9M1 and inverter 9A3 back to the latches to disable latches 9H1 and 9L1 thereby preventing the latches from recognizing further information until they are reset again.

Upon reaching the conference arrangement, the originator can reset latches 9H1 and 9L1 by dialing the code 86 which cause decoder 9C1 to transmit a signal over conductors 901 and 900 to the latches. Resetting latches 9H1 and 9L1 stops the action of the automatic dialers and the originator can select any dialing pattern to restart the automatic dialer.

When the orginator dials the code 85, decoder 9C1 transmits a logical high over conductor 902 to set latch 9N. Latch 9N transmits a high to inverter 9L6 causing driver 9K2 to transmit a high to the automatic dialers over stop-dialing lead FC. This causes all automatic dialers to stop dialing. Latch 9N will be reset from conductor 900 when the orginator disconnects or dials the reset code 86.

The output of code driver 112 is transmitted over conductors N80-N84 through transfer gates 9GN80-9GN84 to the automatic dialers associated with each conferee port such as automatic dialer 117 shown in block diagram in FIG. 6. The transfer gates 9GN80-9GN84 are actuated under control of flip-flop 9H1. For example, when the orginator's port is seized the high on conductor M2 is transmitted over conductor 203 in FIG. 9, through buffer gate 9G4 to reset flip-flop 9H1 and similar flip-flops such as 9J1 associated with other conferee ports. This puts a logical high on conductors such as 204 to partially enable the transfer gates similar to gates 9GN80-9GN84 for each automatic dialer. One transfer gate for each automatic dialer is enabled depending on the dialing pattern received over conductors N80-N84.

When the orginator dials a code for a particular conferee port its corresponding NN- lead in the group NN00-NN59 will have a logical high that will be inverted by one of the inverters such as 9K1 to set a flip-flop such as 9H1 corresponding to the conferee port number that was dialed. For the remainder of the conference call all dialing action by the automatic dialer associated with that port will be stopped.

Automatic Dialer (FIGS. 12–17)

As mentioned above, each conferee port has an automatic dialer associated therewith. Part of the automatic dialer associated with conferee port circuit 115 is shown in FIGS. 12–16 arranged according to FIG. 17. The automatic dialers can be functionally divided into control circuitry and a random access memory. Each automatic dialer is independent of the other units and provides a memory for different telephone numbers each having up to 14 digits in the illustrative embodiment. Further, in the example being described, each automatic dialer will store up to ten different telephone numbers in five different dialing patterns so there is a regular and alternate telephone number for each pattern. As discussed above, the pattern selection is made by the last digit of the telephone number dialed by the originator to gain access to the conference arrangement or by a three-digit code dialed after the originator has been connected to the conference.

Since each regular number in the memory of the automatic dialer has an alternate number, the automatic dialer is arranged to try the alternate if the conferee does not respond within a prescribed interval after the regular number is dialed. The automatic dialers interface with a program control 120 shown in the block diagram of FIG. 1. The programming of the memories of the automatic dialers is done from program control 120. The programmer selects a conferee port and a particular random access memory of the automatic dialer associated with that port and an address in that memory by operating various keys and buttons on a console (not shown) which is part of program control 120.

When activated by the conference circuit, the automatic dialer is triggered by a logical high on one of the conductors N80′–N84′ (see FIG. 12) indicating that one of the dialing patterns has been selected either through the dial pulse incoming register or from the manual selection mode when the orginator keys-in a pattern number.

NOR gate 12M senses this high on conductors N80′–N84′ causing its output to go low which is inverted by inverter 12B5 and transmitted as a logical high over conductor S to four different circuits. First, the high on conductor S is transmitted over conductor 1400 and inverted by NAND gate 14I2 to apply a low to OR gate 14AD2 thereby triggering one shot 14KA and setting flip-flop 14DTL. In its set condition, flip-flop 13DTL turns on transistor 14Q40 to operate relay 14DT.

Figure 15:
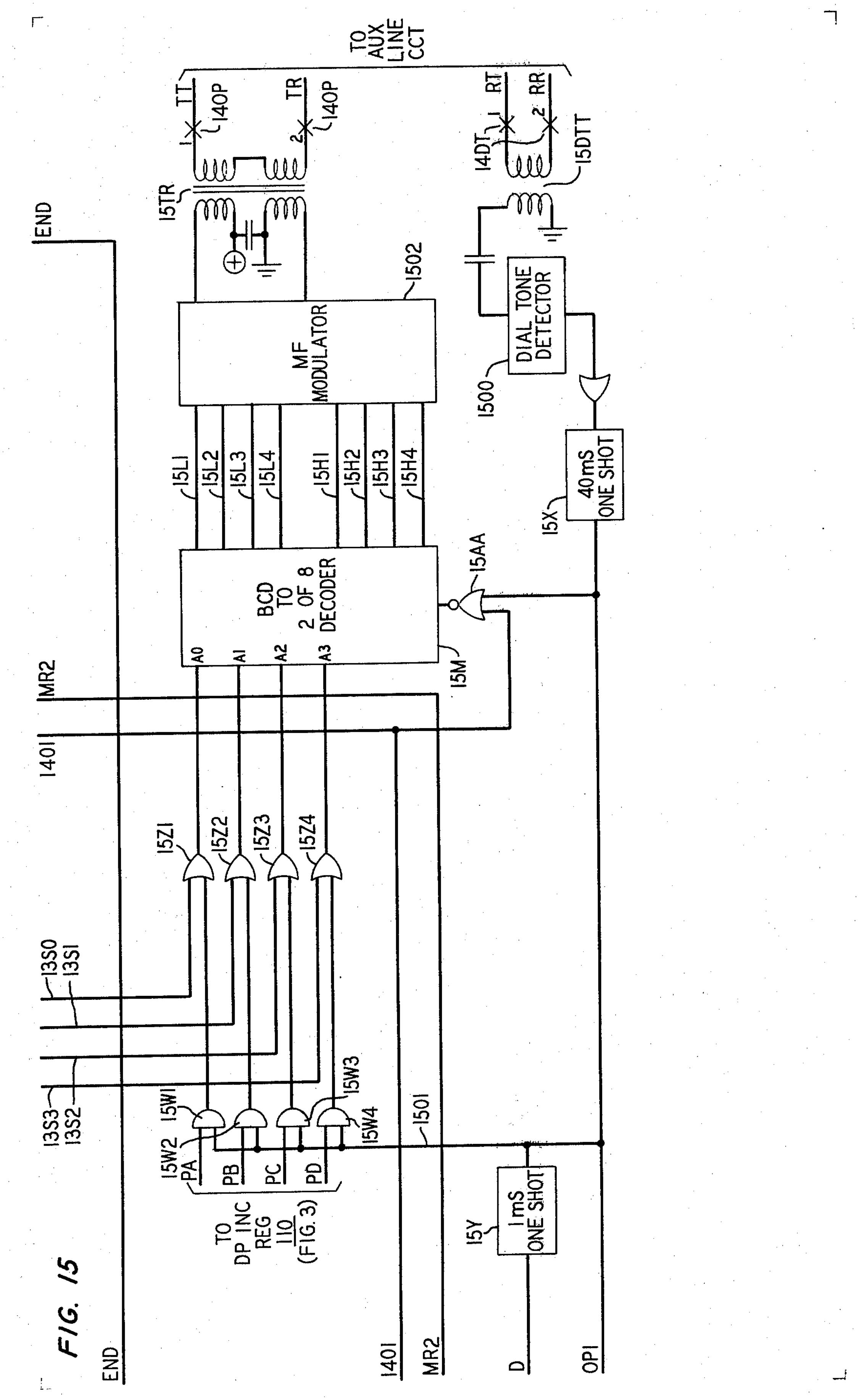

Relay 14DT closes its contacts 14DT-1 and 14DT-2 in FIG. 15 to couple dial tone detector 1500 through trasformer 15DTT to the receive path which interconnects the conferee port circuit with the auxiliary line circuit at the switching center.

At the same time, the high on conductor S will be inverted by inverter 14B3 and transmitted to one of the inputs of NOR gate 14D3. Since the other inputs of gate 14D3 are low, gate 14D3 will transmit a logical high output over E lead 805 to conferee port circuit 115 and the auxiliary line circuit at the switching center. This signal on E lead 805 causes the auxiliary line circuit to be seized at the switching center.

The high on E lead 805 is inverted by inverter 14B4 to enable OR gate 14F2 which transmits a low signal to OR gate 14AB1. The logical low output of OR gate 14AB1 is transmitted over conductor MR1 to trigger master timer 16TM. Master timer 16TM puts out ten pulses per second on lead 10pps to control the transmittal of multifrequency dialing signals over the auxiliary line circuit as described below. In addition, timer 16TM provides the timing for dial tone on conductor 1600 and the no-answer timing on conductor 1601. Both of these timing intervals can be altered by the rearrangement of cross-connections (not shown) within the timer as is well-known in the art.

The dial tone time-out interval in this illustrative embodiment is set at 8 seconds. Thus, after 8 seconds, timer 16TM is triggered and a signal is transmitted over conductor 1600 to enable OR gate 16E2. The output of OR gate 16E2 causes AND gate 16A3 to go low and trigger one shot 16KB for 3 seconds. When triggered, one shot 16KB transmits a high over conductor KB to return the output of NOR gate 14D3 to a logical low. When the output of gate 14D3 goes low this is interpreted by the auxiliary line circuit in the switching system as a disconnect. In other words, if after a line seizure dial tone is not returned with 8 seconds, the auxiliary line circuit will be released.

If dial tone is received over the auxiliary line circuit within a specified interval, detector 1500 will trigger one shot 15X, and at the end of 40 milliseconds, one shot 15Y will be triggered to transmit a logical high on conductor D. The high on conductor D will enable OR gate 14E1 to reset flip-flop 14DTL and flip-flop 14DTL and flip-flop 14DTL releases relay 14DT to remove the dial tone detector from conductors RT and RR. The output of one shot 15Y also sets flip-flop 140PL which causes a high to be transmitted over conductor OP2. This high keeps one shot 16KB from operating, as described above, and prevents the dial tone connection from releasing during the pulsing mode.

The output of one shot 15X is also transmitted over conductor 1501 to enable the precedence digit transfer gates 15W1-15W4 for 40 milliseconds. The other input to these gates is the precedence digit from incoming register 110. The precedence digit in binary-coded-decimal is transferred through OR gates 15Z1-15Z4 to decoder 15M.

The output of one shot 15X is also inverted by NOR gate 15AA which supplies an enable pulse to decoder 15M. The precedence digit received from the incoming register is stored in decoder 15M and converted to a two-out-of-eight format with a signal on one of the four 15L- leads and a signal on one of the four 15H- leads to multifrequency modulator 1502. These signals cause modulator 1502 to transmit a combination of two tones to transformer 15TR.

When one shot 15X was triggered for 40 milliseconds a logical high was transmitted over conductor OP1 to OR gate 14J1 to turn on transistor 14Q20 thereby operating relay 13OP. Relay 14OP causes its contacts 14OP-1 and 14OP-2 to complete path for transmitting the multifrequency tones representing the precedence digit to the auxiliary line circuit at the switching center.

As mentioned above, the triggering of one shot 15Y sets flip-flop 14OPL which puts a low signal on conductor MR2 and a high on conductor OP2. The logical high on conductor OP2 prevents one shot 16KB from triggering and maintains relay 14OP operated.

While conductor MR2 is in a logical low condition, NOR gates 14H2 and 14H3 will have a logical high output each time master timer 16TM transmits a logical low over conductor 10PPS. The signal on conductor MR2 also enables address counter 13J and four-bit multiplex 1300 that are used to read out the telephone numbers stored in random acess memory 13RAM.

Figure 12:
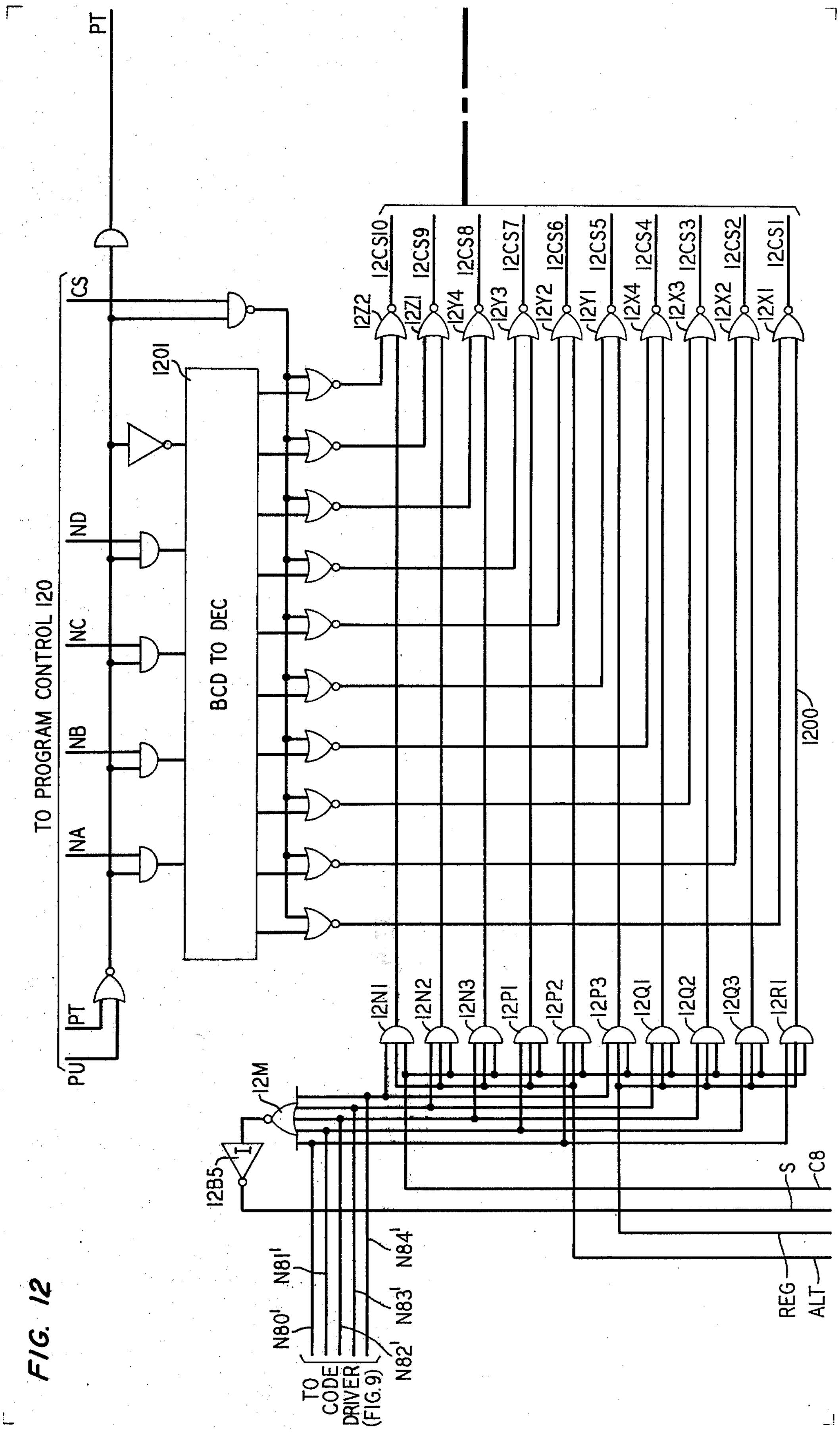
FIGS. 12–16, when arranged in accordance with FIG. 17, show a more detailed schematic representation of the automatic dialing apparatus associated with one conferee port.
Figure 13:
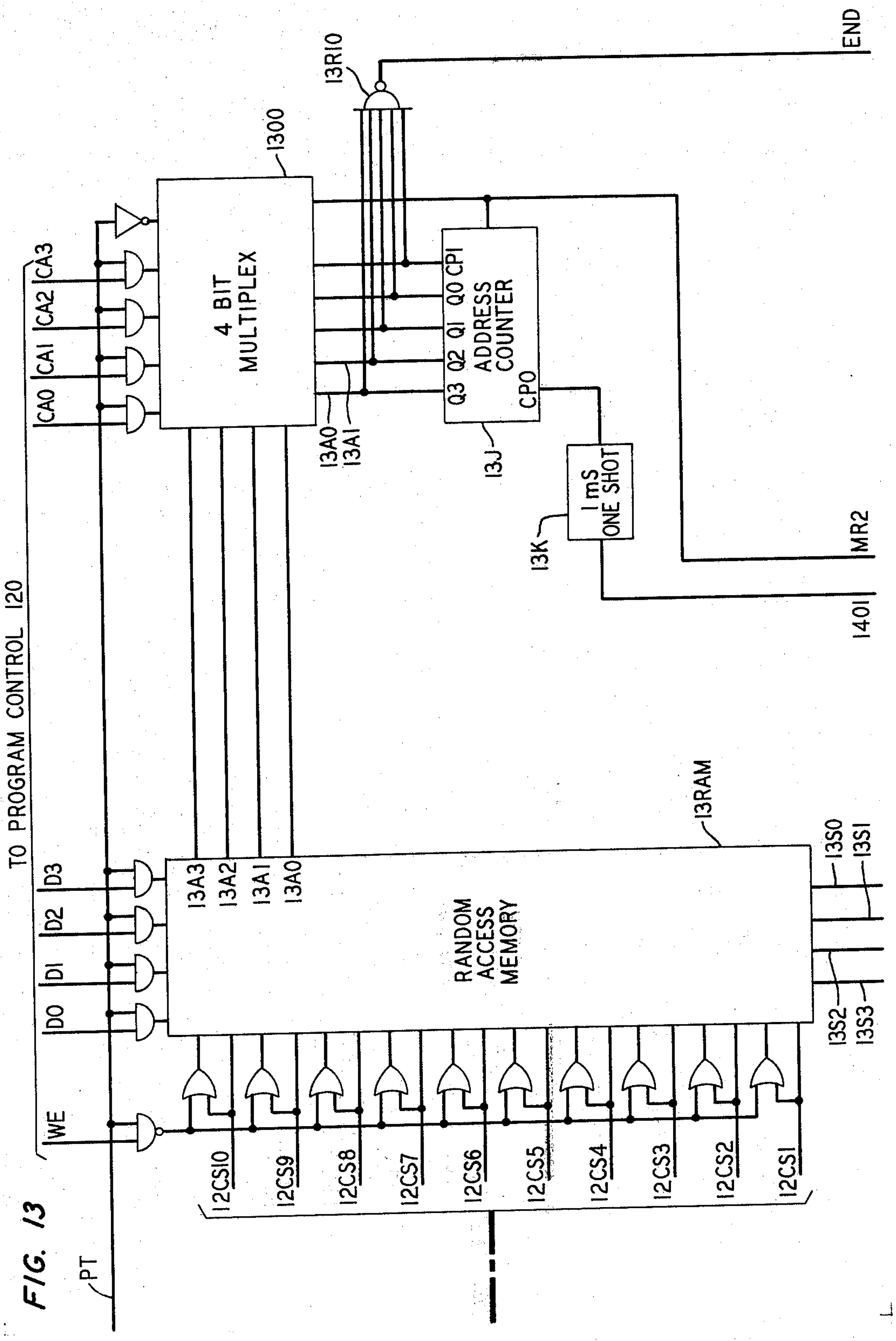
Figure 14:
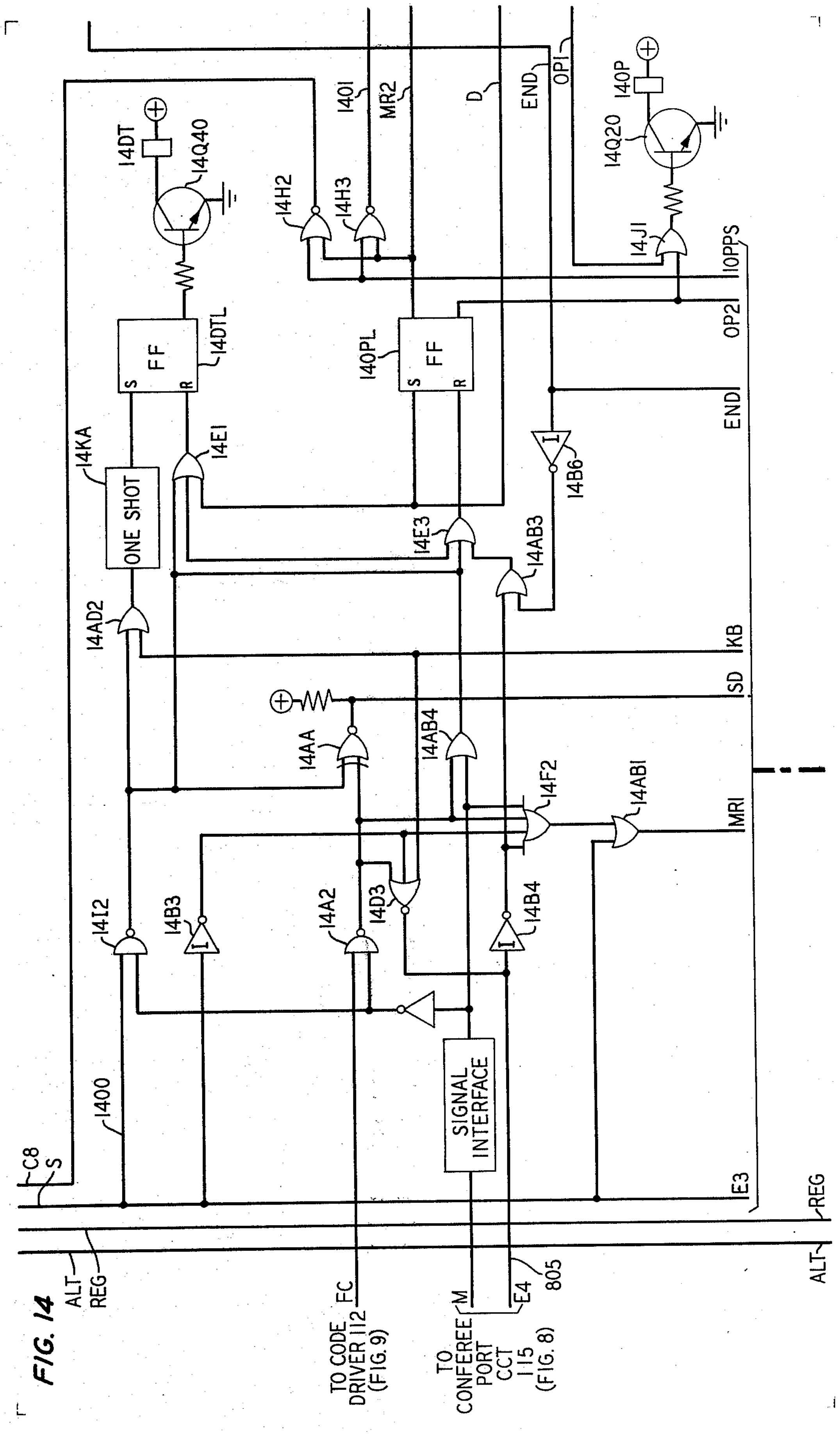

The signals on conductor 1401 are changed to 1 millisecond pulses by one shot 13K causing counter 13J to be in step with the clock pulses on conductor C8 in FIGS. 12 and 14. As the counter 13J is pulsed by one shot 13K it provides a binary-coded-decimal output on conductors 13A0-13A3, through multiplexer 1300, to all random access memories associated with the automatic dialer. Address counter 13J will step from 0000 to 1111 and the corresponding storage area in the memory will be selected. As each storage area is addressed, the contents of that area will be present on conductors 13SO-13S3.

When counter 13J has counted to binary-coded-decimal 15 NAND gate 13R10 will transmit a low signal over conductor END. This low signal is inverted by inverter 14B6 to enable OR gate 14AB3 which, in turn, enables OR gate 14E3 to reset flip-flop 140PL. The resetting of flip-flop 140PL stops the clocing operation by disabling NOR gates 14H2 and 14H3. With flip-flop 140PL reset, relay 14OP releases to disconnect the multifrequency modulator 1502 from the TT and TR conductors.

The output of the random access memory is transmitted in binary-coded-decimal over conductors 13SO-13S3 through OR gates 15Z1-15Z4 to decoder 15M which converts the binary-coded decimal to a two-out-of-eight indication. Decoder 15M is clocked by signals on conductor 1401 which are at clock speed, that is, 10PPS. Since conductor 10PPS also clocks the address counter 13J, decoder 15M will operate at the same rate so that only valid address information from the memory is transmitted to the multifrequency modulator 1502. The output of decoder 15M will cause one high and one low tone representing a digit to be transmitted by modulator 1502.

The particular telephone number that is to be read out of one of the random access memory addresses is selected by a logical high on one of the conductors ALT or REG in FIG. 12, a logical high on one of the pattern number conductors N80′-N84′ and a clock pulse on conductor C8. When the pattern number 80 is selected and the regular telephone number is to be dialed AND gate 12R1 will be enabled to transmit a logical high over conductor 1200. The logical high is inverted by NOR gate 12X1 to transmit a logical low over conductor 12CS1.

If the customer at the station identified by the regular number does not answer within a selected time interval, a logical high signal will be transmitted on conductor ALT and conductor REG will go low. This causes gate 12R1 to turn off and gate 12P2 to turn on. With gate 12P2 on, a low signal is transmitted over conductor 12C6 to the random access memory wherein the alternate telephone number is selected.

Figures 16, 17:
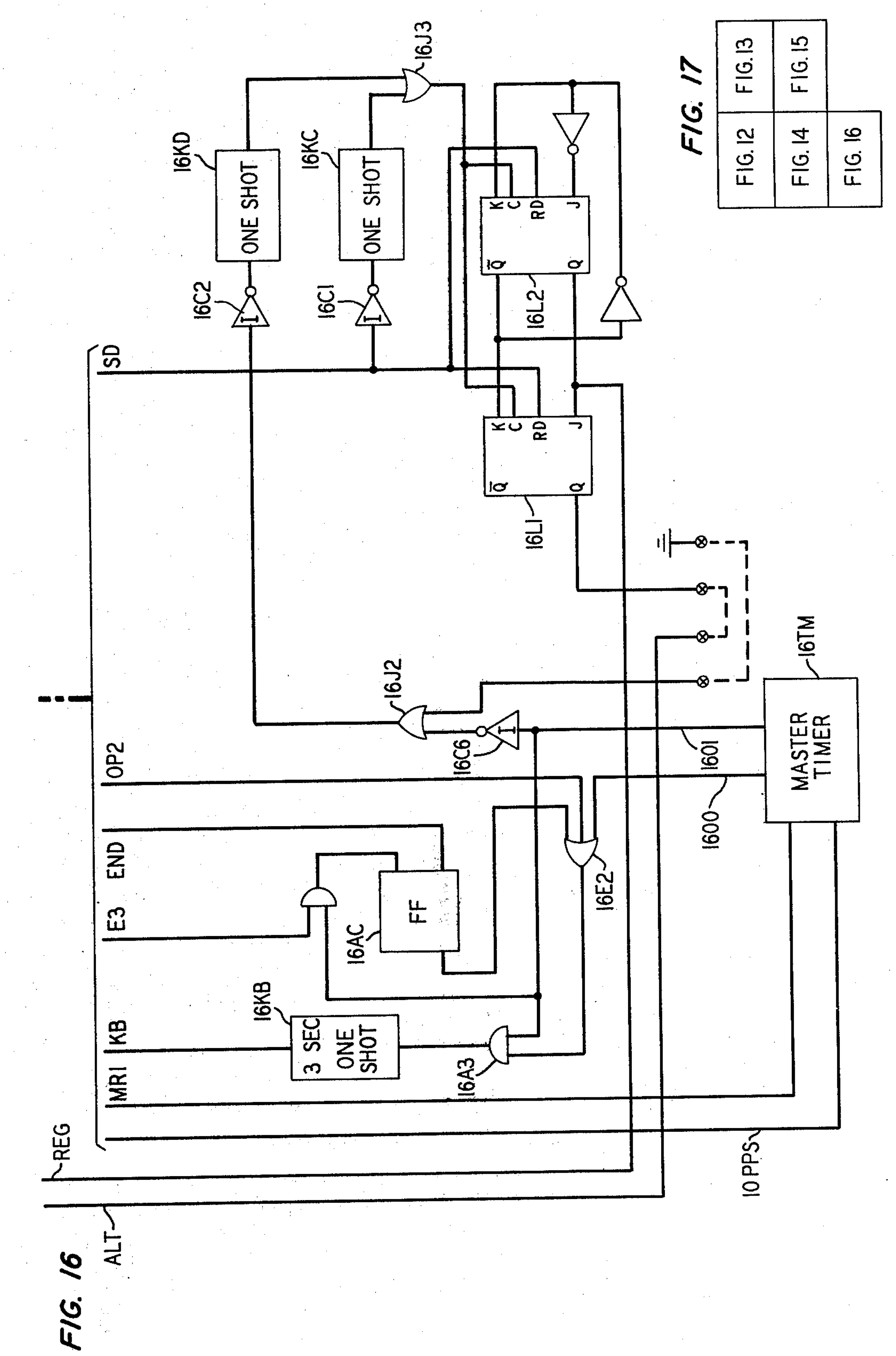

The selection of alternate and regular telephone numbers from the random access memory is under control of circuitry in FIG. 16. When the automatic dialer was initially seized the signal on conductor S causes NAND gate 14I2 to have a low output and EXCLUSIVE OR gate 14AA to have a high output which is transmitted over conductor SD to unlok the J-K binaries. The high on conductor SD is also inverted by inverter 16C1 to trigger one shot 16KC which will first set the J-K binaries to the regular telephone number position.

If answer supervision is not received from the auxiliary line circuit on conductor 811 via the conferee port within the time-out interval, the logical low from master timer 16TM is transmitted to gate 16A3 to trigger one shot 16KB, thereby resetting the automatic dialer. Timer 16TM transmits a low on conductor 1601 after the no-answer timing interval and this low is inverted by inverter 16C6 which enables OR gate 16J2, whose output is inverted by inverter 16C2. The output of inverter 16C2 triggers one shot 16KD which enables OR gate 16J3 to advance to J-K binaries 16L1 and 16L2. The J-K binaries disconnect a logical high from conductor REG and apply the high to conductor ALT. The alternate telephone number will now be dialed and if answer supervision is not returned within the prescribed interval the J-K binaries 16L1 and 16L2 will shift back causing the regular telephone number to be dialed.

In the event the originator wishes to stop the automatic dialers, he transmits a control character and the code 85. This causes a logical high to be transmitted from code driver 112 (shown in FIG. 9) over conductor FC to the automatic dialers. Gate 14A2 will have a logical high output and the EXCLUSIVE NOR gate 14AA will transmit a low on stop-dialer conductor SD to lock the operation of J-K binaries 16L1 and 16L2. The output of gate 14A2 also enables OR gate 14F2 which enables OR gate 14AB1 to signal over conductor MR1 thereby stopping master timer 16TM. In addition, the output of gate 14A2 enables OR gate 14AB4 which, in turn, enables OR gates 14E1 and 14E3 to reset flip-flops 14DTL and 14OPL thereby releasing the corresponding relays 14DT and 14OP. Finally, the output of gate 14A2 will enable NOR gate 14D3 to transmit a logical low over E lead 805 to remove the seizure signal from the auxiliary line circuit at the switching center.

As mentioned above, the automatic dialers are programmed from program control 120 which has not been shown in detail to simplify the Drawing. A particular automatic dialer is selected by signals on the port tens and port units conductors PT and PU which are individual to each conferee port. The address in memory to be changed is selected by signals over conductors NA-ND from program control 120 and stored in decoder 1201 while the new telephone number to be inserted in the memory is transmitted from program control 120 over conductors D0-D3 under the control of a signal on write enable conductor WE.

Summary

As can be seen from the above description, the conference arrangement is connected to a telephone switching center and comprises a transmission bridge having an originator's port circuit and a plurality of conferee port circuits. Each conferee port circuit is equipped with an automatic dialer that is programmed to establish connections via the switching center to regular and alternate telephone numbers identifying the desired conferees. Associated with the originating port circuit is a dial pulse register for receiving the precedence and pattern number digits from the switching center and these digits are forwarded to the automatic dialers to establish a precedence level for the conference call and to select a particular program or group of conferees to be summoned.

Also associated with the orginating port circuit is a multifrequency receiver and decoder which responds to tone signals transmitted by the originator's key set to control the various modes of operation of the conference arrangement.

The conference arrangement can function in a primary or secondary mode. When the conference originator is connected directly to a bridge, the bridge is said to be operating in its primary mode. While connected to a primary bridge the originator can cause a conferee port circuit to establish a connection to another bridge which is then operated in its secondary mode. Selective control of primary and secondary bridges is accomplished by the originator transmitting the number sign # or the asterisk * preceding each command code.

The following is a list of some of the two-digit command codes that have been used in the exemplary embodiment of the invention:

| Codes | Function |
|---|---|
| 00 | Used by the originator to return to the transmission bridge from the ad-lib bus. |
| 01–57 | Used to select a particular conferee port. |
| 70 | Releases the broadcast mode of operation. |
| 71 | Starts conference alerting tone. |
| 72 | Activates the broadcast mode. |
| 73 | Used to disconnect a conferee from a port so that originator may dial a new conferee. This code must be preceded by a port address. |
| 75 | Used by the originator to disconnect a conferee without receiving new dial tone. |
| 80–84 | Automatic dialing pattern numbers. |
| 85 | Stops the operation of the automatic dialer for the duration of the conference call. |
| 86 | Releases automatic dialer and automatic dialer can be restarted by sending one of the pattern number codes. |

What is claimed is:

1. A conference arrangement for use with a switching system comprising a multiport transmission bridge, an originating circuit for coupling a calling customer station to a port of said bridge, a plurality of terminating circuits each for coupling a called customer station to a corresponding port of said bridge, and control means responsive to signals received from said calling station for selecting each individual one of said terminating circuits and thereafter selectively controlling the mode of voice path coupling of said selected terminating circuits in response to additional signals.

2. The conference arrangement defined in claim 1 wherein said control means comprises code driver means for placing said terminating circuits in any of the disconnect, broadcast or private conversation modes in response to said additional signals.

3. The conference arrangement defined in claim 1 wherein said signals comprise coded signals, whrein said control means comprises decoder means having an input responsive to said coded signals for translating each said coded signal into an M-out-of-N output signal (where M and N are integers), and wherein is also provided code driver means for transmitting said output signals to said originating and terminating circuits.

4. The conference arrangement defined in claim 3 wherein each said called station is identified by an address and wherein each said terminating circuit also comprises apparatus effective when actuated for automatically dialing a preselected one of said addresses to summon a wanted called station for connection to said transmission bridge.

5. The conference arrangement as defined in claim 4 wherein said code driver means comprises a first code driver circuit responsive to a first series of said M integers for controlling said originating circuit, a second code driver circuit responsive to a second series of said M integers for controlling said terminating circuits and a third code driver circuit responsive to a third series of said M integers for controlling said dialing apparatus.

6. The conference arrangement defined in claim 5 wherein said coded signals represent a plurality of digits, and wherein said decoder means comprises first register means responsive to the registering of a first one of said digits for generating a first select signal corresponding to a particular one of said first register digits, second register means responsive to the registration of a second one of said digits for generataing a second select signal corresponding to the particular one of said second registered digits, and means for steering each received digit to a corresponding one of said first and second register means.

7. The conference arrangement defined in claim 6 wherein is also provided means coupling said first register means individually with each said code driver circuit to transmit a select signal to a particular one of said code driver circuits in accordance with the digit registered in said first register means and means coupling said second register means with all said code driver circuits to simultaneously transmit said second select signals to all said code driver circuits.

8. The conference arrangement defined in claim 7 wherein each said code driver circuit comprises means jointly responsive to said first select signal and said second select signal to generate a discrete signal to control one of said originating and terminating circuits and said dialers.

9. A conference arrangement for use with a telephone switching system comprising a multiport transmission bridge, an originating port circuit for coupling a calling station to a port of said bridge, a plurality of terminating port circuits each for coupling a called customer station to a corresponding port of said bridge, automatic dialer apparatus individually associated with each terminating port circuit and effective when actuated for dialing the addresses of preselected ones of said called customer stations, register means associated with said originating port circuit and responsive to first coded signals from said switching center for actuating said dialers, and receiver means coupled to said originating port circuit and responsive to second coded signals from said calling station for disabling said dialers.

10. The conference arrangement defined in claim 9 wherein each said dialer comprises a memory for storing a plurality of predetermined telephone numbers assigned to said called station, and control circuitry responsive to a dialing pattern number for reading out of said memory a particular one of said stored telephone numbers in accordance with said dialing pattern number.

11. The conference arrangement defined in claim 10 wherein said first coded signals comprise first dialing pattern number signals received from said switching system, wherein second coded signals comprise second dialing pattern number signals received from said calling station, and wherein is also provided code driver means responsive to said first and second dialing pattern number signals to actuate said dialers.

12. A conference arrangement for use with a telephone switching center which serves a plurality of customer stations comprising a multiport transmission bridge, an originating port circuit for interconnecting a trunk circuit at said switching center with a port of said bridge, a plurality of terminating port circuits each for interconnecting a line circuit at said switching center with a port of said bridge, a plurality of automatic dialers each individually associated with a corresponding one of said terminating port and line circuits and each responsive to the receipt of patterned number signals for initiating a request for service by said switching center over its corresponding line circuit, means effective upon the establishment of a connection from a calling one of said stations to said originating port circuit for registering a plurality of digit signals received from said switching center, means effective after said calling station is connected to said bridge for receiving coded signals from said calling station, and means responsive to said digits and said coded signals for generating said pattern number signals to actuate said dialers.

13. The conference arrangement defined in claim 12 wherein each said dialer comprises a memory including a plurality of regular telephone numbers associated with a first group of called customer stations and a plurality of alternate directory numbers associated with a second group of called customer stations and means effective upon the receipt of a particular patterned number signal for alternately reading out of said memory one of said regular telephone numbers and one of said alternate telephone numbers.

14. The conference arrangement defined in claim 13 wherein each said dialer comprises means effective when a service request is initiated by said dialer for detecting dial tone transmitted from said switching center, means responsive to said detecting means for transmitting a particular one of said regular telephone numbers to said switching center, means actuated by said transmitting means for timing an interval and means effective at the end of said interval and in the absence of an answer signal from the called station identified by said particular telephone number for causing said transmitting means to transmit a designated one of said alternate telephone numbers.

15. A conference arrangement for use with a switching center serving a plurality of customer stations comprising a multiport transmission bridge, an originating port circuit for coupling a calling one of said stations to a port of said bridge, a plurality of terminating port circuits connected to said bridge, a communication bus common to said port circuits, dialer means responsive to signals received from said switching center for causing each of said terminating port circuits to establish a communication path from said bridge to an individual called one of said stations, and means responsive to coded signals received from said calling station for selective controlling said port circuits.

16. The conference arrangement defined in claim 15 wherein said decoder means comprises means responsive to a particular one of said coded signals for selectively transferring said calling station and one of said called stations from said bridge to said bus.

17. The conference arrangement defined in claim 15 wherein said decoder means comprises circuit means responsive to a particular one of said coded signals for causing a selected one of said terminating port circuits to disconnect the corresponding communication path between a called station and said bridge.

18. The conference arrangement defined in claim 17 wherein said circuit means comprises means for causing said selected terminating port circuit to initiate a request for service by said switching center and wherein means are provided for interconnecting the originating port circuit with the selected port circuit over said bus to permit said calling station to transmit call-directing signals to said switching center via the selected port circuit.

* * * * *